US012708904B2

(12) United States Patent
Mueller et al.

(10) Patent No.: US 12,708,904 B2
(45) Date of Patent: Aug. 18, 2026

(54) INSTRUMENT AND METHOD FOR SEALING, DESEALING, AND/OR RESEALING OF SAMPLE TUBES

(71) Applicant: Roche Diagnostics Operations, Inc., Indianapolis, IN (US)

(72) Inventors: Daniel Mueller, Meierskappel (CH); Claudio Cherubini, Cham (CH); Dirk Abeln, Zug (CH); Reto Huesser, Hagendorn (CH); Marko Simic, Zug (CH); Nenad Milicevic, Baar (CH); Michael Zeder, Buchrain (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 308 days.

(21) Appl. No.: 18/532,264

(22) Filed: Dec. 7, 2023

(65) Prior Publication Data

US 2024/0198347 A1 Jun. 20, 2024

(30) Foreign Application Priority Data

Dec. 16, 2022 (EP) .................................... 22214127

(51) Int. Cl.

*B01L 9/00* (2006.01)
*B01L 9/06* (2006.01)
*G01N 35/00* (2006.01)

(52) U.S. Cl.

CPC .................. *B01L 9/50* (2013.01); *B01L 9/06* (2013.01); *G01N 35/00584* (2013.01);

(Continued)

(58) Field of Classification Search

CPC ........ B01L 9/50; B01L 9/06; B01L 2200/025; B01L 2200/0689; B01L 2300/041; G01N 35/00584

(Continued)

(56) References Cited

U.S. PATENT DOCUMENTS

2002/0041828 A1 4/2002 Spitz
2002/0168299 A1 11/2002 Chang et al.

(Continued)

FOREIGN PATENT DOCUMENTS

JP 2941464 8/1999
JP 2001-055201 2/2001

(Continued)

OTHER PUBLICATIONS

Translation of JP-2017026381-A (Year: 2017).*

*Primary Examiner* — Nathaniel T Woodward
(74) *Attorney, Agent, or Firm* — Woodard, Emhardt, Henry, Reeves & Wagner, LLP

(57) ABSTRACT

The present invention relates to an instrument for automatically removing sealing covers from sample vessels (and/or for automatically sealing or resealing sample vessels with sealing covers, the instrument comprising a vessel holder for holding a sample vessel, and a suction/induction device comprising a suction member for holding a sealing cover, and an induction member comprising at least one induction coil, with the suction/induction device and the vessel holder being arranged in an axially movable manner with regard to each other, and, in use, the at least one induction coil is arranged above a bottom of the suction member. In addition, the present invention relates to a laboratory automation system comprising such instrument as well as a plurality of pre-analytical, analytical and/or post-analytical stations, and also relates to a method of automatically removing sealing (Continued)

covers from sample vessels and a method of automatically sealing or resealing sample vessels with sealing covers.

33 Claims, 9 Drawing Sheets

(52) U.S. Cl.
CPC . *B01L 2200/025* (2013.01); *B01L 2200/0689* (2013.01); *B01L 2300/041* (2013.01); *B01L 2300/12* (2013.01)

(58) Field of Classification Search
USPC ........................................................ 73/864.91
See application file for complete search history.

(56) References Cited

U.S. PATENT DOCUMENTS

| | | | | |
|---|---|---|---|---|
| 2019/0293670 | A1* | 9/2019 | Mueller ................. | G01N 35/10 |
| 2021/0356484 | A1* | 11/2021 | Utsugi .................. | G01N 35/04 |

FOREIGN PATENT DOCUMENTS

| | | |
|---|---|---|
| JP | 2004-057803 | 2/2004 |
| JP | 2008-018960 | 1/2008 |
| JP | 2017-026381 | 2/2017 |
| JP | 2017026381 A * | 2/2017 |

* cited by examiner 323
31
321
33

323
31
321

323'
31
321

323
31
321
324

323
31
321

323
31
321
332'
33'
331'

321
8
91′
9′
332′

8
91
9
321
33
331′

INSTRUMENT AND METHOD FOR SEALING, DESEALING, AND/OR RESEALING OF SAMPLE TUBES

TECHNICAL FIELD

Generally, the present invention relates to the technical field of sample analysis, such as the analysis of biological samples, and further to the technical field of high throughput analysis of biological samples.

In particular, the present invention is directed to an instrument for automatically removing sealing covers from sample vessels or sample containers, such as sample tubes or vials, which removing of sealing covers from sample vessels is also referred to as “desealing” of sealed sample vessels, wherein the same instrument can be used for automatically sealing unsealed sample vessels in the first place, or also for automatically resealing sample vessels which have already been desealed, or unsealed, before. Here, the term “sealed”, “sealing” or “resealing” encompasses a hermetical sealing of the content of the sample vessel by means of a sealing cover.

Such sealing cover, which is meant as protection against evaporation and contamination, i.e. as means for ensuring sample integrity, provides several advantages compared to the also commonly known multidiameter caps as sample vessel closure, such as the fact that the sealing covers are more cost efficient, provide liquid tightness, generate less waste and require less volume for storage and transport, which is highly important for compact laboratory systems. In addition, the present invention relates to a method for automatically removing sealing covers from sample vessels, i.e. for automatically desealing sealed sample vessels, as well as to a method for automatically sealing or resealing sample vessels with sealing covers, wherein the respective instrument comes to use. Here, in general, automation of sealing/desealing/resealing of sample vessels provides certain advantages compared to a respective manual procedure, such as the enablement of fully automated recursive workflow, increased throughput, reduced risk of contact of a user with infectious material, e.g. by spillage during seal removal, reduced labor costs, and the possibility of more a reproducible process, in particular since automation can result in avoiding a ripping of the sealing cover, slippage or sporadic sticking of the sealing cover in case of too strong adhesive bond.

BACKGROUND

For many biological, biochemical, diagnostic or therapeutic applications, it is essential to be able to accurately determine the amount or concentration of a certain substance or compound in a biological sample, such as a certain antigen or nucleic acid, for example a biological sample contained in a reaction mixture or the like. In order to be able to achieve this goal accurately, methods have been developed over the years, such as the widely known Polymerase Chain Reaction (PCR), for example in the form of a real-time PCR, digital PCR (dPCR) or multiplex PCR, which enable the in vitro synthesis of nucleic acids in a biological sample, through which a DNA segment can be specifically replicated, i.e. a cost-effective way to copy or amplify small segments of DNA or RNA in the sample. The development of these methods for amplifying DNA or RNA segments has generated enormous benefits in gene analysis as well as the diagnosis of many genetic diseases, or also in the detection of viral load. Usually, thermal cycling, also referred to as thermocycling, can be utilized to provide heating and cooling of reactants in a sample provided inside a sample vessel, such as a reaction vessel for amplifying such DNA or RNA segments, wherein thermocycler are commonly used in order to achieve an automatic procedure of diagnostic assays based on PCR, in which, during a PCR conduct, the liquid PCR-samples as well as the respective reactants have to be initially transferred into the sample vessel before being heated and cooled to differing temperature levels repeatedly. During the time of thermocycling, and also after removing thermally cycled sample during e.g. analytical processing, the content of the sample vessel must be sealed inside the sample vessel in a fluid-tight manner.

In recent years, there was a need to not only carry out such analytical, pre-analytical or post-analytical processing faster, but also to process a higher number of samples simultaneously, which resulted in the development of automated processing systems, such as laboratory automation systems, e.g. the Cobas® p 612 pre-analytical system. Usually, in modern medical analysis systems, after having removed the cap from the sample vessels for a medical analysis, the openings of the sample vessels are closed by flexible film sealing covers. According to state of the art, if, for any reason, an additional test of the sample needs to be performed after initial testing, an operator must manually remove the sealing cover, and return the sample vessel to the analyser. Therefore, the need existed to enable not only the automated opening, or decapping, of capped sample vessels, but also the need to automatically deseal sample vessels closed not by caps but sealed by sealing elements. Automated desealing brings along several advantages compared to manual desealing, such as the possibility of a fully automated recursive workflow, increased throughput, reduced risk of contact of a sample by a user, e.g. by spillage during cap or seal removal, reduced labor costs, and more reproducible process results. In addition, the need existed to automatically seal or reseal open sample vessels after or during processing, in order to prevent contamination of the sample and/or to store the sample inside the sample vessel, e.g. in case additional sample is required at a later stage, or in case the reaction mixture inside the sealed sample vessel should be further analyzed after a certain amount of time. In order to seal or reseal the sample vessels, a respective sealing element can be provided, which necessitates precise handling in order to enable a proper sealing-off of the sample vessel. Such sealing element can be provided in the form of flexible sealing covers, such as film or foil seals made of thin material that covers, seals, and often overhangs the opening at the top of the sample tube. Usually, the sealing cover, for sealing or resealing the sample vessel, is to be bonded to the top of the sample vessel in such a way that it can be torn off the opening with a mechanical pulling force. The advantages of sealing covers vis-à-vis caps, such as multidiameter caps, can be found in the fact that sealing covers are more cost-efficient, liquid tightness can be ensured in a better way, removed sealing covers produce less waste than caps, and sealing covers require less volume for storage and transport.

As a concrete example, the sample vessel in the form of a sample tube can be used for initially accommodating the sample, as test tube for a thermocycler for performing chemical and/or biological reactions, such as PCR, or as a test tube for any other kind of in vitro diagnostic procedure, such as hematology or coagulation testing, for which the samples need to be centrifuged. Here, the terms “sample” and “biological sample” refer to material(s) that may potentially contain an analyte of interest, wherein the biological sample can be derived from any biological source, such as a physiological fluid, including blood, saliva, ocular lens fluid, cerebrospinal fluid, sweat, urine, stool, semen, milk, ascites fluid, mucous, synovial fluid, peritoneal fluid, amniotic fluid, tissue, cultured cells, or the like, and wherein the sample can be suspected to e.g. contain a certain antigen or nucleic acid.

In the course of developing instruments which can improve the above described automated sample processing, several attempts were made to improve the handling of sample vessels and respective sealing covers when it comes to desealing and/or sealing/resealing of these sample vessels. For example, EP 2 059 470 B1 describes an apparatus for removing a flexible film seal from a sealed container, which apparatus exhibits, inter alia, pinch plates for pinching the flexible film seal of the sealed container, wherein the apparatus can cause moving motions of a head assembly and a sealed container away from each other, in order to remove the seal from the container. With such solution, however, the risk coming along with pure mechanical tearing exists that the flexible film seal breaks during removal movement, and that the flexible film seal is not completely removed in case a strong bonding force is chosen. On the other side, in case of choosing a weak bonding force, so that the seal can be removed more easily, the bonding force of the seal is less strong, resulting in accidental leakage. As another example for respective solutions provided in the past, JP 6646371 B2 discloses an instrument and method for removing a sealing cover from a sample tube by means of a high frequency coil forming a magnetic field space, thereby inductively heating an adhesive material provided between the sealing cover and the sample tube. After heating the adhesive material, the sealing cover is pushed downwards by a sealing cover attaching means and then sucked onto the same, thereby being able to remove the sealing cover from the sample tube. In further detail, the high frequency coil is provided in a horse saddle shape so that the sample tube can be passed under the higher positioned parts of the horse saddle coil, and the lower positioned parts of the horse saddle coil are used for generating the magnetic field space for inductively heating the sealing cover from the side. In view of the fact that sealing covers often overhang the opening at the top of the sample tube to its sides, the problem can occur that overhanging parts of the sealing cover, which parts are also provided with adhesive, are heated and, thus, glued to the side of the sample tube, thereby impeding a removal of the sealing cover from the sample tube instead of simplifying the same.

Due to these and other problems and disadvantages, the prior art suggestions as presented above cannot fulfill the needs of users nowadays and, thus, do not provide satisfying solutions. Therefore, the general need exists in the present technical field to provide a method and instrument for being able to securely deseal and/or seal/reseal a sample vessel automatically, in order to make diagnostic assays a lot faster and, thus, cheaper to perform while improving efficiency.

SUMMARY OF THE INVENTION

The present invention addresses the above described problems of improving a desealing and/or sealing/resealing instrument and respective method. According to a first aspect of the present invention, an instrument for automatically removing sealing covers from sample vessels and/or for automatically sealing or resealing sample vessels with sealing covers is provided, the instrument comprising a vessel holder for holding a sample vessel, and a suction/induction device, wherein the suction/induction device comprises a suction member for holding a sealing cover, e.g. in the form of a vacuum gripper such as a vacuum cup, and an induction member comprising at least one induction coil. Accordingly, the induction member can exhibit one single coil, or several coils next to each other, wherein the plurality of coils can be arranged in a concentric manner, one surrounding the other, resulting in the possibility of activating only an inner coil, a middle coil, if any, and/or an outer coil, thereby defining an induction application area of the induction member. Also, in general, it is pointed out that the induction coil of the induction member requires suitable power electronics. The suction/induction device and the vessel holder are arranged in an axially movable manner with regard to each other, and, in use, the at least one induction coil, e.g. the bottom side of the induction coil, is arranged above a bottom of the suction member or is arranged at the same height as the bottom of the suction member. In this regard, the bottom of the suction member is the suction side of the suction member for providing sucking force onto an item to be sucked, and the term "device" relates to a unit or entity, in which the included components, such as the suction member and the induction member, are united/interconnected parts, e.g. integrally connected parts of a combined entity. With the particular spatial arrangement of suction member, induction member and vessel holder in the claimed instrument, it can be ensured that the induction coil is always arranged above a sealing cover to be removed from the sample vessel or to be applied to the sample vessel, resulting in that heating of any overhanging parts of the sealing cover, which might lead to adhering these overhanging parts to an outer circumference of the sample vessel, can be avoided. Here, the overhanging parts of the sealing cover are folded down parts of the sealing cover, which are folded down such that the sealing covers of the sample vessels which are loaded into a rack of a respective laboratory system do not touch each other, also in order to avoid that a gripper might lift up neighboring sample vessels during picking up the desired sample vessel due to the overlapping parts. Accordingly, the risk probability, that the overlapping seal parts are bonded to a sample vessel side wall during is significantly reduced, since the induction coil is placed above the sample vessel opening and, in this position, the distance from the induction coil to the folded down sealing cover is larger than the distance to the sealing cover at the opening or rim of the sample vessel.

According to a specific embodiment of the instrument of the present invention, the suction member is arranged within a central opening of the induction member, wherein the central opening of the induction member can coincide with a core of the at least one induction coil, the induction coil thereby surrounding the suction member. With such structure, it can be ensured that the induction coil covers an upper surface of a rim of the sample vessel, i.e. an area in which the sealing cover and the sample vessel are attached to each other by means of the sealing adhesive, whereas a central area of the sealing cover is not covered by the induction coil and is, thus, free for the suction member to attached to the sealing cover by suction force. In regard to material properties, the backing material of the sealing cover can be made of a layer of electrically conducting and/or magnetic material such as aluminum, or can be made of layers of electrically conducting and electrically non-conducting materials such as polyethylene terephthalate (PET) and/or aluminum, and can be provided as a foil, in particular a flexible foil, or film. The sealing material provided at the bottom side of the sealing cover can be made of a heat seal lacquer such as a methacrylate olefin copolymer.

According to a further specific embodiment of the instrument of the present invention, the induction member further comprises a rebound member, also referred to as flux concentrator or magnetic flux concentrator, for directing a magnetic field generated by the induction member to a desired direction, to increase the flux density and for shielding the magnetic field in the other, non-desired, directions, i.e. directing the magnetic field away from the rebound member itself. Accordingly, the flux concentrator acts as a kind of orientation means for orientating and concentrating the magnetic field generated by the induction member to the desired direction, i.e. by the at least one induction coil, towards the target, i.e. the area of the sealing cover being attached to the rim of the sample vessel. Accordingly, the flux concentrator intensifies the magnetic field at the targeted area and has a shielding effect to the sides and to the top, thereby increasing the efficiency in power or heat transfer. Also, the proposed flux concentrator can help to further focus the field lines to the sealing cover at the sample vessel rim, thereby further reducing electromagnetic field strength at overlapping parts of the sealing cover, preferably to zero at an end of the overlapping parts. Thus, the risk of sealing the overlapping parts unintentionally to the sample vessel wall during the desealing process can be further reduced by means of the flux concentrator. The rebound member can comprise a central opening coaxially aligned with the central opening of the induction member. Thereby again, the field lines can be concentrated towards the targeted area of the sealing cover along the sample vessel rim and less to the non-adhered areas of the sealing cover. Here, the central opening can have a similar or identical diameter as the central opening of the induction member, for ensuring unobstructed passage of the suction member through the induction member. In addition, in regard to a concrete embodiment of the rebound member, the same can comprise a plate-like shape, wherein the plate-shaped rebound member can exhibit a similar or identical outer diameter as the induction member. Thereby, any discharge of magnetic flux generated by the at least one induction coil in an opposite direction away from a bottom end of the suction member, i.e. in an opposite direction away from the sealing cover can be avoided, and the generated magnetic flux can be concentrated. Alternatively, the rebound member can exhibit a cup-like shape accommodating the at least one induction coil within its inner cavity, i.e. the inner cavity of the cup. Accordingly, the induction coil is not only lined up on one side at a plate-like base of the cup, but is also surrounded by an outer wall of the cup. With such accommodating structure of the rebound member, any discharge of magnetic flux generated by the at least one induction coil in any direction away from the sealing cover can be avoided, and the generated magnetic flux can be further concentrated onto the adhesive parts of the sealing cover. In addition, the inner cavity of the rebound member can be separated from its central opening by an inner wall, resulting in that the at least one induction coil is not only lined up on one side at the plate-like base of the cup, but is also surrounded by an outer wall of the cup as well as pierced by an inner wall of the cup. With such accommodating structure of the rebound member, the avoidance of discharge of magnetic flux generated by the at least one induction coil away from the sealing cover can further be avoided, and the generated magnetic flux can be even further concentrated onto the adhesive parts of the sealing cover.

According to a further specific embodiment of the instrument of the present invention, in addition to the previously described rebound member, the suction/induction device can further comprise a cover member arranged at the induction member on a side opposite to the rebound member, i.e. on an axial side of the at least one induction coil not being covered by the rebound member. The cover member can be made of a polymer such as polypropylene (PP) or expanded polypropylene (EPP), ideally in order to avoid any heat conduction as well as interaction with electromagnetic field lines. With such structure of the suction/induction device, a certain distance between the at least one induction coil and the sealing cover can be ensured, wherein a thickness of the cover member precisely defines the distance between induction coil(s) and sealing cover. Thereby, it can be ensured that, in case of a bellows suction cup, the same can contract, and the application of magnetic flux onto the sealing cover can be controlled, since the distance between induction coil(s) and sealing cover affects the induced Eddy-currents and, thus, the heat generated by the induction heating process. In regard to the later, the cover member can consist of an electrically non-conductive and/or non-magnetic material and/or a material with none or only very low thermal and/or electromagnetic conductivity, in order to avoid any disturbance of magnetic flux applied onto the sealing cover, i.e. a material that does not alter the generated magnetic fields. In regard to the desired low or non-existent thermal conductivity, polypropylene or expanded polypropylene can be used as material for the cover member, as already mentioned above, wherein polypropylene exhibits a very low thermal conductivity of about 0.2 W/mK, whereas expanded polypropylene is considered to be thermal isolating material and, thus, exhibits basically no thermal conductivity at about 0.04 W/mK, In regard to the particular structure of the cover member, the same can comprise a plate-like shape with a central opening coaxially aligned with the central opening of the induction member, similarly to the rebound member but arranged on an opposite side of the at least one induction coil, wherein the central opening of the cover member can exhibit a similar or identical inner diameter as the central opening of the induction member, for ensuring unobstructed passage of the suction member through the cover member. Additionally, the central opening of the cover member can comprise a conical shape tapered towards the suction member. Thereby, the cover member provides a centring function for centring the sealed top end of the sample vessel towards the suction member and the induction member. Also, the conical central opening of the cover member can comprise a step before merging with/passing into the central opening of the induction member, which step can provide an abutting face for any centred top end of the sample vessel. In such case, a thickness of the step precisely defines the distance between induction coil(s) and sealing cover. Thereby, it can be ensured that, in case of a bellows suction cup, the same can contract, and the application of magnetic flux onto the sealing cover can be controlled, since the distance between induction coil(s) and sealing cover affects energy input.

According to a further specific embodiment of the instrument of the present invention, the suction member and the induction member are arranged in a coaxial manner, i.e. the central axis of the suction member and the central axis of the induction member are aligned with each other on the same axis. Alternatively or additionally, the suction member, the induction member and the vessel holder are arranged in a coaxial manner, i.e. the central axis of the suction member, the central axis of the induction member and the central axis of the vessel holder are aligned with each other on the same axis. Thereby, a centred movement of the suction member vis-à-vis the induction member, or a centred movement of the suction/induction device vis-à-vis the vessel holder can be achieved, in order to improve the ability to orientate the magnetic flux to the targeted areas of the sealing cover, and also to ensure a sufficient and centric contact between the suction member and the sealing cover. Alternatively or additionally, the suction/induction device can be arranged in a tiltable manner in regard to the vessel holder. Thus, unevenness of the top end of the sample vessel, i.e. of the rim of the top end of the sample vessel, can be compensated, in particular since a planarity of the rim can be altered as a result of a sealing process due to the generation of heat in view of the material of the sample vessel, which can be made of glass or transparent and/or translucent and/or opaque plastic, in particular polypropylene (PP) and/or polystyrene (PS) and/or polyethylene terephthalate (PET), or any other solid material. Alternatively or additionally, the suction member can comprise a bellows suction cup or a flat suction cup, in general also referred to as vacuum pad. Thereby, holding a sealing cover by means of negative pressure becomes possible, wherein a bottom end of the cup of the suction member can be arranged in a manner protruding from the suction/induction device, wherein the cup can be arranged in an axially movable manner. Thus, a secure grasp of a sealing cover can be ensured.

Further alternatively or additionally, at least one of the suction/induction device and the vessel holder is spring-loaded towards the other in an axial manner. In further detail, one of the suction/induction device and the vessel holder, or both of them, can be spring-loaded in an axial direction in order to keep contact pressure in regard to the other component, i.e. in regard to each other, as low as possible, e.g. by means of a weak spring or the like. Accordingly, a position of the induction coil in regard to the sealing cover can be moved in axial contact with as low as possible force, or alternatively based on a detected sample vessel position via a sensor, such as a photoelectric sensor or the like. Thus, the applied contact force between suction/induction device and vessel holder can be limited to a sufficient degree.

According to a further specific embodiment of the instrument of the present invention, the at least one induction coil of the induction member is segmented radially into different areas including respective windings, for size-control of an area of the induction member providing magnetic flux. Thereby, different independently activatable windings can be achieved per induction coil. Thus, by means of the possibility of segmentation of the at least one induction, it becomes feasible to activate only inner or only outer windings, wherein driving numerous windings can require numerous drivers and the like. Also, in case of providing more than one induction coil, each of the plurality of the induction coils can again be segmented, thereby achieving an even smaller defined induction application area of the induction member. Also, in general, by means of the provision of more than one induction coil, it becomes possible to have more than one induction "level" or induction application area, such as two levels, or even more than two levels, e.g. by using three concentric induction coils. In regard to the later, it should be considered that a certain number of windings is necessary per induction coil in order to avoid too high currents. Also, when considering the provision of a plurality of induction coils, a guiding of the wires at the top of the induction member must be considered, e.g. in regard to a spatial arrangement. In this regard, thinner windings per induction coil can be implemented in case of cooled induction coils, such as internally cooled hollow wires. Furthermore, a skin effect at very high frequencies must be considered for the number of windings of each induction coil, i.e. the tendency of alternating high-frequency currents to crowd toward the surface of a conducting material. This phenomenon restricts the current to a small part of the total cross-sectional area and so has the effect of increasing the resistance of the conductor.

According to a further specific embodiment of the instrument of the present invention, the instrument further comprises a top clamping mechanism interconnectedly arranged with the suction/induction device, wherein the top clamping mechanism is adapted to clamp a top end of a sample vessel beneath its sealing cover, for accurately positioning the top end of the sample vessel and the suction/induction device. In further detail, the top clamping mechanism, also referred to as coil clamp or coil head clamp, can be connected to the suction/induction device, in order to be able to clamp the upper part of the sample vessel in order to precisely position the sample vessel opening and the induction coil in an x- and y-direction in relation to each other, which can be ensured since the top clamping mechanism and the induction member are implemented as one single or integrated unit, wherein the top clamping mechanism can grip the sample vessel close to its top end, but below any overlapping sealing cover parts, and also above the tube holder. As an example of the top clamping mechanism, the same can be provided in the form of at least two sample vessel gripping fingers, for gripping the upper part of the sample vessel as previously described. When describing clamping mechanisms, it is also possible to implement the vessel holder as a bottom clamping mechanism, which can be provided in a similar way as the top clamping mechanism, i.e. in the form of at least two sample vessel gripping fingers. Thus, in view of the provision of a top clamping mechanism and a bottom clamping mechanism, a general clamping process of a sample vessel can be described as follows: At first, the sample vessel is clamped by the bottom clamping mechanism in order to avoid lifting up of the sample vessel when the sealing cover is removed by the suction member, e.g. in the form of a vacuum gripper. Subsequently, either the bottom clamping mechanism brings the sample vessel into a desired axial or z-position, i.e. moves the sample vessel up, depending on a length of the sample vessel, or the induction/suction device is moved down to a desired axial or z-position, again depending on a length of the sample vessel, which way of moving depends on the overall concept of the instrument of the present invention and the surrounding components of its laboratory automation system. Afterwards, the top clamping mechanism clamps an upper part of the sample vessel in order to precisely position a top end of the sample vessel, i.e. the sealed opening of the sample vessel, and the induction member with the induction coil in the x- and y-direction. Then, the induction/suction device moves into contact with the sealing cover in z-direction, with a contact force as low as possible. Thus, a gentle "docking" of the suction member onto the sealing cover and a precise positioning of the induction coil in relation to the sealing cover can be achieved.

The basic idea of the top clamping mechanism is to ensure that the sample vessel can be aligned concentrically with the induction coil as precisely as possible without the necessity of additional sensors, i.e. by means of the mechanical construction itself, so that the magnetic field along the edge of the sample vessel at the sample vessel opening is as equal as possible at any location, which is important to making the de-sealing work in a reliable manner. Since the top clamping mechanism consisting of two or three gripping fingers together with the induction coil form an assembly or unit, the sample vessel can always be aligned in a concentric manner provided that all gripping fingers are mechanically coupled and are moved laterally for the same distance measured from the sample vessel's central axis, with the gripping fingers being initially aligned with each other so that they are positioned concentrically with regard to the induction coil. In such case, it is preferable that the vessel holder is spring-loaded in a lateral direction so that no skewing of the sample vessel or lateral release of the vessel holder gripping fingers can occur. In addition, it is preferred that the suction/induction device is pivotable, which can help to bring the induction coil into better contact with the sample vessel's edge in case the sample vessel was not sealed evenly, e.g. in case the sealing cover was pressed down more on one side than on the other of the sample vessel's rim. Such pivotability of the suction/induction device, however, renders the respective mechanics more complicated. In such case, it has to be made sure that the induction coil is still concentric with the sample vessel after the induction coil has been pivoted.

According to a further aspect of the present invention, a laboratory automation system is provided, the system comprising a plurality of pre-analytical, analytical and/or post-analytical stations, and an instrument as described above. In further detail, such stations can be one or several of a hematology testing station, a coagulation testing station, and the like, and the instrument can be adapted for desealing, sealing and/or resealing sample vessels for use in any one of these laboratory automation stations.

The instrument and system as described above are particularly adapted to carry out the methods as described in the following.

According to a further aspect of the present invention, a method of automatically removing sealing covers from sample vessels by means of an instrument as described above is provided herewith, the method also being referred to as a desealing method. Here, the desealing method comprises, preferably in the given order, the following steps:

- providing a sealed sample vessel in the vessel holder, for holding the sample vessel in a predetermined orientation;
- moving the suction/induction device and the vessel holder towards each other until the suction/induction device and the sealing cover are either in contact with each other or in a predetermined distance with each other, with the induction member being positioned above the sealing cover;
- sucking the sealing cover by means of the suction member applying negative pressure onto the sealing cover;
- applying a current to the at least one induction coil, for melting a sealing material provided at the bottom side of the sealing cover, i.e. arranged between the sample vessel and the sealing cover in an assembled state; and
- moving the suction/induction device and the vessel holder away from each other while maintaining negative pressure applied onto the sealing cover, thereby removing the sealing cover from the sample vessel.

In the above step of applying a current to the at least one induction coil, the current can be applied to create an alternating magnetic field, e.g. by means of an electronic oscillator.

By carrying out the above desealing method steps, with the induction coil always being positioned above the sealing cover, i.e. the induction coil never passing by at a side of the sealing cover or the sample vessel, it can be ensured that only the sealing cover attached to the rim of the open top end of the sample vessel is heated, and that heating of any overhanging parts of the sealing cover, which might lead to an undesired adhering of these overhanging parts to an outer circumference of the sample vessel, can be avoided. Also, with the above described desealing method, it becomes possible that heating time, point in time of lift-off time, etc. of heating the sealing cover becomes shorter than the time needed for the heat to transfer from the upper part of the sealing cover at the rim of the sample vessel to an edge of any overlapping part of the sealing cover. In addition, the above described method results in less deformation of the rim of the sample vessel, since no force is applied to the sample vessel during induction heating, in particular due to the fact that pulling force is applied to the sealing cover, instead of a pushing force.

According to a specific embodiment of the desealing method of the present invention, the step of moving the suction/induction device and the vessel holder towards each other includes a centering of the sealed sample vessel to the induction member. Thus, the sealing cover provided at the open end of the sample vessel will be positioned in a centralized manner in regard to the suction member and in regard to the induction member, for allowing the sealing cover to be uniformly heated by the induction member, and for allowing a central sucking of the sealing cover by the suction member.

According to a further specific embodiment of the desealing method of the present invention, the step of applying a current to the at least one induction coil includes applying the current to inner and/or outer areas of the at least one induction coil, depending on the diameter of the sealed sample vessel. Accordingly, it is possible to heat the sealing cover either by means of inner areas of the induction coil, i.e. by an inner induction area, or by means of outer areas of the induction coil, i.e. by an outer induction area, or by means of inner and outer areas of the induction coil, i.e. by a full induction area. Here, the choice of induction area depends on the size of the diameter of the sealed sample vessel, i.e. the size of the sealing area of the sealing cover being attached to the rim of the sample vessel by means of adhesive. Accordingly, the induction coil areas are applied with current correlating to a top rim area of the sealed sample vessel. Thereby, the applied current can be focused only on the sealing area, i.e. the area of adhesive contact between sealing cover and top rim of the sample vessel, resulting in the avoidance of energy waste as well as in the avoidance of heating other parts of the sealing cover besides the adhesive contact area and, thus, in the further avoidance of heating of any overhanging parts of the sealing cover.

According to a further specific embodiment of the desealing method of the present invention, different parameters of the inventive instrument or of its use can be altered in order to adapt the method and its outcome to the material and/or vessel diameter of the used sample vessel. For example, a magnitude of the applied current, an application time of the current and/or a distance between the at least one induction coil and the sealing cover can be adapted to the material of the sealed sample vessel and/or to a vessel diameter of the sealed sample vessel. As a concrete example, a large vessel diameter usually results in a large adhesive contact area between sealing cover and top rim of the sample vessel, such that a respectively large magnitude of the applied current and/or a respectively long application time of the current to be applied to the sealing cover can be chosen, in order to achieve the desired heating effect. Additionally or alternatively, a distance between the induction coil and the sealing cover can be chosen in a way such that sufficient induction heating of the sealing cover is achieved, wherein a short distance results in a quicker heating of the sealing cover, and a less short distance can prolong the heating time of the sealing cover. Accordingly, changing certain parameters of the instrument or method can actually have a substantial impact on the heating results. Based thereon, varying parameters of the sample vessel are acceptable, by means of e.g. changing the gap between sample vessel opening and induction coil's bottom side, which gap change influences the induced maximal temperature or needed time for heating up the seal to the desired maximal temperature, wherein the distance can be adjusted to consider different types of sample vessels in regard to material or size.

In view of the above, it is pointed out that the idea is to adjust the desealing process parameters in accordance with a material of the sample vessel, i.e. the tube polymer type, and to sample vessel dimensions, such as tube diameter, to reach a sealing temperature in the range of 230° C.+/−30° C., 170° C.+/−30° C. or 110° C.+/−30° C. depending on the used heat seal lacquer formulation, i.e. depending on the melting point of the used heat seal lacquer. Here, it is preferable to use a heat seal lacquer with a melting temperature below the melting temperature of the material of the sample vessel, so that an applied melting temperature only melts the heat seal lacquer but not the sample vessel material. Often, however, the melting temperature of the heat seal lacquer is higher than the melting temperature of the sample vessel material, which makes it difficult to avoid melting of the sample vessel material during heat desealing. In addition, in regard to the adjustment of desealing process parameters in accordance with sample vessel characteristics, the same could be provided by a laboratory information system. The target temperature can be reached by adjusting the applied heating energy, either by adjusting the applied current or voltage and/or the application time. As a concrete example, an increase in application time by 10 to 40 ms, or in more detail 20-26 ms, for sample vessels made of polypropylene can be useful, and an increase in application time by 10 to 40 ms, or in more detail about 23 ms, can be useful for sample vessels with small diameter, with a general rule of generating 1° C. per ms. Alternatively or additionally, the desealing process parameters can also be adjusted by adjusting a distance between the induction coil and the rim of the sample vessel, thereby achieving an indirect influence on the heating energy, wherein a reduction in distance in an axial direction, i.e. z-direction, in the range of 0.1 to 0.6 mm, or in more detail 0.3 to 0.35 mm, for sample vessels made of polypropylene can be useful, and 0.1 to 0.6 mm, or in more detail about 0.3 mm can be useful for sample vessels with small diameter, with a general rule of generating 7° C. per distance reduction of 0.1 mm. However, in this regard, a general problem exists in regard to the avoidance of melting not only the heat seal lacquer but also the material of the sample vessel at some point, resulting in a deformation of a rim of the sample vessel, or of polymer fibers in general. Thus, as a solution, only short heat pulses can be applied, i.e. short de-sealing process time is applied, such that the heat transfer to the tube material via heat conduction to the sample vessel and to overlapping parts of the sealing cover is controlled, and that radiation is limited by very short heating phase and immediate lift-off of sealing cover, for reducing the risk of melting of sample vessel material. Alternatively or additionally, an induction pulse is to be held only for short time, such that only as much heat flow of thermal energy as needed to melt the heat seal lacquer is used, such that the heat flow rate to the material of the sample vessel is limited, thereby again reducing the risk of melting of sample vessel material, since the sample vessel material often exhibits a lower melting temperature than the heat seal lacquer. In general, after heat generation, the induction coil should be moved away from the sealing cover immediately. Furthermore, as additional measures, excessive pressure application onto the rim of the sample vessel is to be avoided in order to avoid pressure on seal and tube, and it can be preferable to generate pulling force on the sealing cover before the heat seal lacquer is completely melted instead. This can be achieved by e.g. contraction of the bellows suction cup when negative pressure is applied. Also, high lift-off speed and high lift-off acceleration during lift-off of the sealing cover is preferable, in order to keep potential fiber lengthening of the heat seal lacquer and/or of the tube material low and to keep the time for potential heat conduction into the sample vessel short, e.g. by means of applying only a short heat pulse and/or holding the heat pulse for only a very short time. Thereby, any generated heat seal lacquer fibers and/or sample vessel fibers are quickly torn off, thereby keeping a fiber length low along with keeping the time for heat conduction into the sample vessel short.

According to a further specific embodiment of the desealing method of the present invention, the step of applying a current to the at least one induction coil and the step of moving the suction/induction device and the vessel holder away from each other can overlap each other to a certain degree. Here, the application of a pulling force onto the sealing cover as a result of the suction step and of the subsequent moving step, and the melting of the sealing material provided between the sample vessel and the sealing cover can overlap, such that the sucked sealing cover with the melted sealing material, preferably still in its melted condition, is pulled away from the sample vessel, in order to achieve a smooth and problem-free removal of the sealing cover from the sample vessel.

In other words, the general process of desealing a sample vessel can be described as follows: First, the vessel holder moves down towards a sample vessel holder, such as a tube rack or the like, and clamps the sample vessel. Then, the sample vessel is lifted out of the holder in z-direction until the sample vessel is positioned at a small distance of 2 to 3 mm adjacent to the induction coil and/or suction/induction device. The two or three gripping fingers of the top clamping mechanism then move in the same direction laterally together/towards each other, towards the induction coil's central axis, until the sample vessel is clamped. Here, it can be preferred if the vessel holder is either laterally mounted in a spring-loaded manner so that it can yield and avoid the sample vessel being pushed into an inclined position by the top clamping mechanism, or alternatively the gripping fingers of the vessel holder are released, i.e. slightly moved away from the sample vessel. Afterwards, the suction/induction device, but not the top clamping mechanism, descends vertically into contact with the sample vessel. Here, the suction/induction device can be spring-loaded in an axial direction, so that it is in contact with a predefined force, preferably as small a force as possible to avoid the rim being melted down, or alternatively the movement is controlled by means of a light barrier.

Then, the de-sealing process starts by switching on a magnetic alternating field, and the suction/induction device moves up abruptly after a predefined time, whereas the top clamping mechanism remains in position, thereby removing the sealing cover. In case the gripping fingers of the vessel holder have previously been released, the same are tightened again. The gripping fingers of the top clamping mechanism are released, and the vessel holder moves down and places the sample vessel back in the holder. Afterwards, the removed sealing cover is disposed of, e.g. by applying positive pressure to the suction member, into a waste container, e.g. by means of a tube or the like positioned below the suction/induction device and leading to the waste container, for transmittal of the sealing cover into the waste container.

In general, one of the potential problems during desealing is that there is only a small optimal parameter area where the de-sealing process via induction heating works on an optimal level. A variation of different input factors can have significant impact on output variation. Accordingly, a respective process control is preferable, since it is particularly difficult to measure the temperature at the desealing location in operation due to geometric and physical limitations of the instrument. As a solution to this problem, a force sensor and/or a pressure sensor can be used to control and verify and/or monitor the heating process and the lift-off process of the sealing cover during desealing. Accordingly, a force sensor can be integrated directly into a linear actuator such as a linear motor axis, i.e. a linear motor axis with integrated force-displacement measuring technology, such as provided by e.g. Jenny Science®, Switzerland, and, thus, can be part of the instrument, which axis moves the suction/induction device in a vertical direction, i.e. to and away from the sample vessel. Alternatively, the force sensor could be positioned between the suction/induction device and the linear actuator. In both cases, the force sensor is moved along when the suction/induction device is moved to and away from the sample vessel. The force sensor can provide information on a tensile force and a compressive force during contacting the sealing cover as well as during heating process and lift-off process, in addition to the information regarding time and distance in the vertical direction during heating process and lift-off process. A curve representing force and/or temperature over time can then be generated and used for providing information about a successful or unsuccessful lift-off process.

In regard to the above described force sensor, when the suction/induction device is coming into contact with the sealing cover, i.e. when any part of the suction/induction device presses against the sealing cover, positive pressure force value increase can be registered. Then, after contact between the suction member of the suction/induction device and the sealing cover, tension force is generated when trying to pull on the still attached and not yet heated sealing cover by means of the suction member. Then, the tension force should start to slightly decrease at the same time as heating is started, since the heat seal lacquer, i.e. the adhesive, melts and, thus, gives way, i.e. the tension force acting on the force sensor is getting smaller. Thereby, it can be verified that the heating process has started and it can be evaluated based thereon if the adhesive starts to melt. Afterwards, the tension force should start to increase abruptly when the suction/induction device together with the sucked sealing cover is lifted up, with the sealing cover still being attached, at least in part, to the sample vessel. Subsequently, the abruptly increased tension force should start to decrease abruptly at the moment when the sealing cover is removed from the sample vessel, i.e. a sudden peak in measured tension force appears when the increasing tension force is changing abruptly into a decreasing tension force at the time of separation of the sealing cover from the sample device. Thereby, success, of the de-sealing process, or lack thereof, can be verified: A successful de-sealing process results in the force peak appearing shortly after lift-off start, i.e. the de-sealing can be verified as successful if the force peak appears within a predetermined time range after the beginning of the lift-off process. In contrast thereto, an unsuccessful or failed de-sealing process can be verified if the force peak is delayed until after the predetermined time range and/or does not fully develop into the expected force peak, i.e. a kind of force plateau can be monitored instead.

In combination with the measurement information from the force sensor, additional measurement information from a pressure sensor can be gathered, which pressure sensor is in connection with the suction member of the suction/induction device, thereby providing information on any pressure change in the suction member. For example, the negative pressure of the suction member applied to the sealing cover usually drops slightly during the lift-off process, since there usually is no perfect air-tight contact between the suction member and the sealing cover, for example due to an imprint on the sealing cover or the like. Accordingly, in case no difference in negative pressure can be monitored in combination with no force peak, it can be derived that the de-sealing was not successful. Alternatively, in case the negative pressure drops significantly after the force peak, it can also be derived that the de-sealing was not successful, since this means that the contact between suction member and sealing cover has been lost. Accordingly, a process control via data from the force sensor and/or via data from the pressure sensor can be used for evaluating the success of the de-sealing process, wherein process monitoring can be challenging since the desealing process takes place very quickly. Since the force sensor can indirectly detect when the heat-sealing lacquer begins to melt, the monitored force signal can also be used as a trigger for the correct lift-off timing.

According to a further aspect of the present invention, a method of automatically sealing or resealing sample vessels with sealing covers by means of an instrument as described above is provided, the method also being referred to as sealing/resealing method. Here, the sealing/resealing method comprises, preferably in the given order, the following steps:

- providing an open sample vessel in the vessel holder, for holding the sample vessel in a predetermined orientation;
- providing a sealing cover and sucking the sealing cover by means of the suction member applying negative pressure onto the sealing cover;
- moving the suction/induction device and the vessel holder towards each other until a bottom side of the sealing cover is in contact with the open top end of the sample vessel, with the induction member being positioned above the sealing cover; and
- applying a current to the at least one induction coil, for melting a sealing material provided at the bottom side of the sealing cover, thereby sealing the open end of the sample vessel with the sealing cover.

In the above step of applying a current to the at least one induction coil, the current can be applied to create an alternating magnetic field, e.g. by means of an electronic oscillator.

By carrying out the above sealing/resealing method steps, with the induction coil always being positioned above the sealing cover, i.e. the induction coil never passing by at a side of the sealing cover or the sample vessel, it can be ensured that only the part of the sealing cover arranged in contact with the open top end of the sample vessel, in particular with the rim of the open top end of the sample vessel, is heated by induction heating, and that heating of any overhanging parts of the sealing cover, which might lead to an undesired adhering of these overhanging parts to an outer circumference of the sample vessel, can be avoided.

According to a specific embodiment of the sealing/resealing method of the present invention, the method further comprises the subsequent steps of stopping the application of negative pressure—or even applying a positive pressure—onto the sealing cover, and of moving the suction/induction device and the vessel holder away from each other. In doing so, the sealing cover adhered to the open end of the sample vessel is left behind, resulting in a sealed or resealed sample vessel, without accidentally removing the sealing cover again from the sample vessel in case the sealing material is still not entirely cured. Further, the inventive sealing/resealing method can further comprise the step of folding excess parts of the sealing cover, which excess parts project from the sample vessel outwards, towards an outer circumference of the sample vessel. In doing so, any parts of the sealing cover which are not adhered to the rim of the sample vessel, and which protrude from the sample vessel to the outside, can be wrapped or folded around an upper part of the sample vessel, without adhering these overlapping parts to the outside of the sample vessel, since the application of induction heat is no longer implemented when carrying out these subsequent method steps.

According to a further specific embodiment of the sealing/resealing method of the present invention, the step of providing the sealing cover includes providing a sealing foil, for example from a roll of foil, and cutting the sealing foil into a shape suitable for sealing the sample vessel, such as a square shape. For example, the step of providing the sealing cover can also be carried out automatically, in order to render the entire method to be carried out in an automatic manner. In general, the sealing cover can be provided on top of the open top end of the sample vessel by means of the suction member, pressed thereon, and sealed thereto by means of applying induction heating.

According to a further specific embodiment of the sealing/resealing method of the present invention, the step of moving the suction/induction device and the vessel holder towards each other includes a centering of the sample vessel to the suction/induction device, similar to the desealing method as described further above. Here again, the sealing cover provided at the open top end of the sample vessel will thus be positioned in a centralized manner in regard to the suction member and in regard to the induction member, for allowing the sealing cover to be uniformly heated by the induction member, and for allowing a central sucking of the sealing cover by the suction member. Also similar to desealing method as described further above, the sealing/resealing method can be implemented in a manner in that the step of applying a current to the at least one induction coil includes applying the current to inner and/or outer areas of the at least one induction coil, depending on the diameter of the sample vessel, wherein the induction coil areas can be applied with current correlate to a top rim area of the sample vessel. Accordingly, it is possible to heat the sealing cover placed on the top rim of the sample vessel to be sealed either by means of inner areas of the induction coil, i.e. by an inner induction area, or by means of outer areas of the induction coil, i.e. by an outer induction area, or by means of inner and outer areas of the induction coil, i.e. by a full induction area. Here, the choice of induction area depends on the size of the diameter of the sample vessel to be sealed, i.e. the size of the sealing area of the sealing cover to be attached to the rim of the sample vessel by means of adhesive. Accordingly, the induction coil areas are applied with current correlating to a top rim area of the sealed sample vessel. Thereby, the applied current can be focused only on the sealing area, i.e. the area of adhesive contact between sealing cover and top rim of the sample vessel, resulting in the avoidance of energy waste as well as in the avoidance of heating other parts of the sealing cover besides the adhesive contact area and, thus, in the further avoidance of heating of any overhanging parts of the sealing cover.

According to a further specific embodiment of the sealing/resealing method of the present invention, a magnitude of the applied current, an application time of the current and/or a distance between the at least one induction coil and the sealing cover is adapted to the material of the sample vessel and/or to a vessel diameter of the sample vessel, similar to the desealing method as described further above. For example, a magnitude of the applied current, an application time of the current and/or a distance between the at least one induction coil and the positioned sealing cover can be adapted to the material of the sample vessel to be sealed and/or to a vessel diameter of the sample vessel to be sealed. As a concrete example, a large vessel diameter usually results in a large adhesive contact area between sealing cover and top rim of the sample vessel, such that a respectively large magnitude of the applied current and/or a respectively long application time of the current to be applied to the sealing cover can be chosen, in order to achieve the desired heating effect. Additionally or alternatively, a distance between the induction coil and the sealing cover can be chosen in a way such that sufficient induction heating of the sealing cover is achieved, wherein a short distance results in a quicker heating of the sealing cover, and a less short distance can prolong the heating time of the sealing cover. Accordingly, changing certain parameters of the instrument or method can actually have a substantial impact on the heating results.

In other words: The proposed sealing/resealing and desealing solution is based on the use of an inductive coil which is placed above the tube opening in order to heat/melt a sealing material, such as a heat seal lacquer, of the aluminum heat sealing foil by inductive heating. Heating of the heat seal lacquer results in a reduced bond strength such that the seal can be removed by means of a vacuum gripper with low force. The inductive coil can be supported by means of a flux concentrator such that mainly the area of the seal at the tube rim/tube opening is heated up, and not the part of the foil that is overlapping and folded down, which would include the risk that the seal sticks to tube side wall, which is to be avoided.

Technical alternatives include the manual peeling of foil, the automated clamping and peeling of foil, piercing of foil, laser cutting of foil, the use of a sealing foil with a much lower bond strength, such as paraffin foil or pressure sensitive adhesive foil, UV activated de-sealing, the use of other means than a sealing foil, such as caps, rubber, bellow, or the like, or heat supported clamping and peeling foil to reduce bond strength before the mechanical removal of seal.

Further details and explanations in regard to configuration and structure of the instrument above can be gathered further below. The above described method steps are preferably carried out in the given order in a subsequent manner, wherein the steps of providing the sample vessel and providing the sealing cover are interchangeable.

Usually, a laboratory automation system which is commonly employed in state-of-the-art laboratories for automatically processing biological sample, can comprise the instruments to carry out the above described methods. Here, the term “laboratory instrument” or “instrument” of the laboratory encompasses any apparatus or apparatus component operable to execute one or more processing steps/workflow steps on one or more biological samples, and covers analytical instruments, pre-analytical instruments, and also post-analytical instruments. The expression "processing steps" thereby refers to physically executed processing steps, such as conducting the particular steps of a PCR conduct. The above described method steps can be controlled by a control unit of such automated processing system, which can also control any kind of actuation or monitoring of the above described device and its components, wherein the term "control unit" as used herein encompasses any physical or virtual processing device, such as a CPU or the like, which can also control the entire instrument or even an entire workstation comprising one or more laboratory instruments in a way that workflow(s) and workflow step(s) are conducted. The control unit may, for example, carry different kinds of application software and instruct the automated processing system or a specific instrument or device thereof to conduct pre-analytical, post-analytical and analytical workflow(s)/workflow step(s). The control unit may receive information from a data management unit regarding which steps need to be performed with a certain sample or sample vessel. Further, the control unit might be integral with a data management unit, may be comprised by a server computer and/or be part of one instrument or even distributed across multiple instruments of the automated processing system. The control unit may, for instance, be embodied as a programmable logic controller running a computer-readable program provided with instructions to perform operations. Here, in order to receive such instructions by a user, a user interface can additionally be provided, wherein the term "user interface" as used herein encompasses any suitable piece of application software and/or hardware for interactions between an operator and a machine, including but not limited to a graphical user interface for receiving as input a command from an operator and also to provide feedback and convey information thereto. Also, a system/device may expose several user interfaces to serve different kinds of users/operators.

As used herein and also in the appended claims, the singular forms "a", "an", and "the" include plural reference unless the context clearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein", "above", "previously" and "below" and words of similar import, when used in this application, shall refer to this application as a whole and not to any particular portions of the application.

Furthermore, certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "base", "above", "upper", "top", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

Advantages of the Invention

In general, induction heating instead of e.g. heating by thermal conduction, such as by means of a hot plate, thermal convection, such as by means of hot air, or thermal radiation, such as by means of an infrared source, provides several advantages, for example (a) the possibility of highly selective local heating, since only the backing material of the sealing cover is heated up and the environment is only indirectly heated up via heat conduction, heat convection and heat radiation from the backing material of the sealing cover, (b) the possibility of a fast heating process, resulting in increased throughput, (c) the possibility to immediately turn off heating, resulting in a very fast drop of temperature, (d) the possibility of easy and fast changes of the structural setting, e.g. different settings for different tube type specific parameters are possible, (e) energy savings, since induction heating is turned on only for a short time during removal of the sealing cover in the range of about 300 ms, (f) less deformation/damage of a sample vessel rim since it is a contactless heating method resulting in that no force needs to act on the sample vessel rim during the sealing/desealing/resealing process, (g) no issues with contact issues compared to contact heating, since missing physical contact due to unevenness of any surface is not critical, and (h) air turbulences do not affect the heating process, i.e. no aerosols are generated, which could result in disadvantageous carry over.

The main advantage of the solution as presented in the present invention is to provide a sealing/resealing/desealing instrument and method capable of reliably sealing/resealing and/or desealing of primary and/or secondary sample vessels in an automated manner in a high throughput laboratory, in a way such that at least one, preferably two, closing, i.e. sealing after removal of primary closure from primary sample vessel, and desealing cycle(s) is possible without negative impact on the sample integrity and on the compatibility with pre- and post processing, transport and/or archiving, and such that the main function of sealing is also guaranteed for a second time sealing second closing opening cycle.

In short, the main advantages in contrast to the known and above described solutions as presented in the prior art are that the solution as described herein allows, inter alia, the de-sealing of seals that are bonded onto a tube with a high bond strength which potentially allows then the transport of the tubes since liquid tightness is guaranteed by the high bond strength, along with a lowered risk of foil ripping due to a bond strength reduced by remelting of heat seal lacquer, and along with a lowered risk of problems with tubes comprising a thread since no pinching plates must move over the thread for gripping the foil. In addition, the solution as described herein avoids the heating of the foil area that is folded down, since the electromagnetic field is generated from above, in particular when a flux concentrator is included, since the magnetic field is concentrated on the tube rim area where the magnetic flux is intensified. Thus no or significantly lowered risk exists that the folded down foil sticks to the tube wall as a result. The presented solution is, thus, compatible with overlapping and folded down foils, meaning that one seal diameter, or one seal width and seal length in case of a rectangular seal shape, can be used for all kinds of tube diameters, since no cutting of the seal to be in accordance with a tube diameter is required.

To avoid repetition in the figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. If applicable, technical features from a device or system claim can be used in the course of the claimed method or use, or vice versa. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more figures represent the same or similar elements.

The following examples are intended to illustrate a specific embodiment of the present invention. As such, the specific modification as discussed hereinafter is not to be construed as limitation on the scope of the present invention. It will be apparent to the person skilled in the art that various equivalents, changes, and modifications may be made without departing from the scope of the present invention, and it is thus to be understood that such equivalent embodiments are to be included herein. Further aspects and advantages of the present invention will become apparent from the following description of the specific embodiment illustrated in the figures.

REFERENCE NUMERALS

Figure 1:
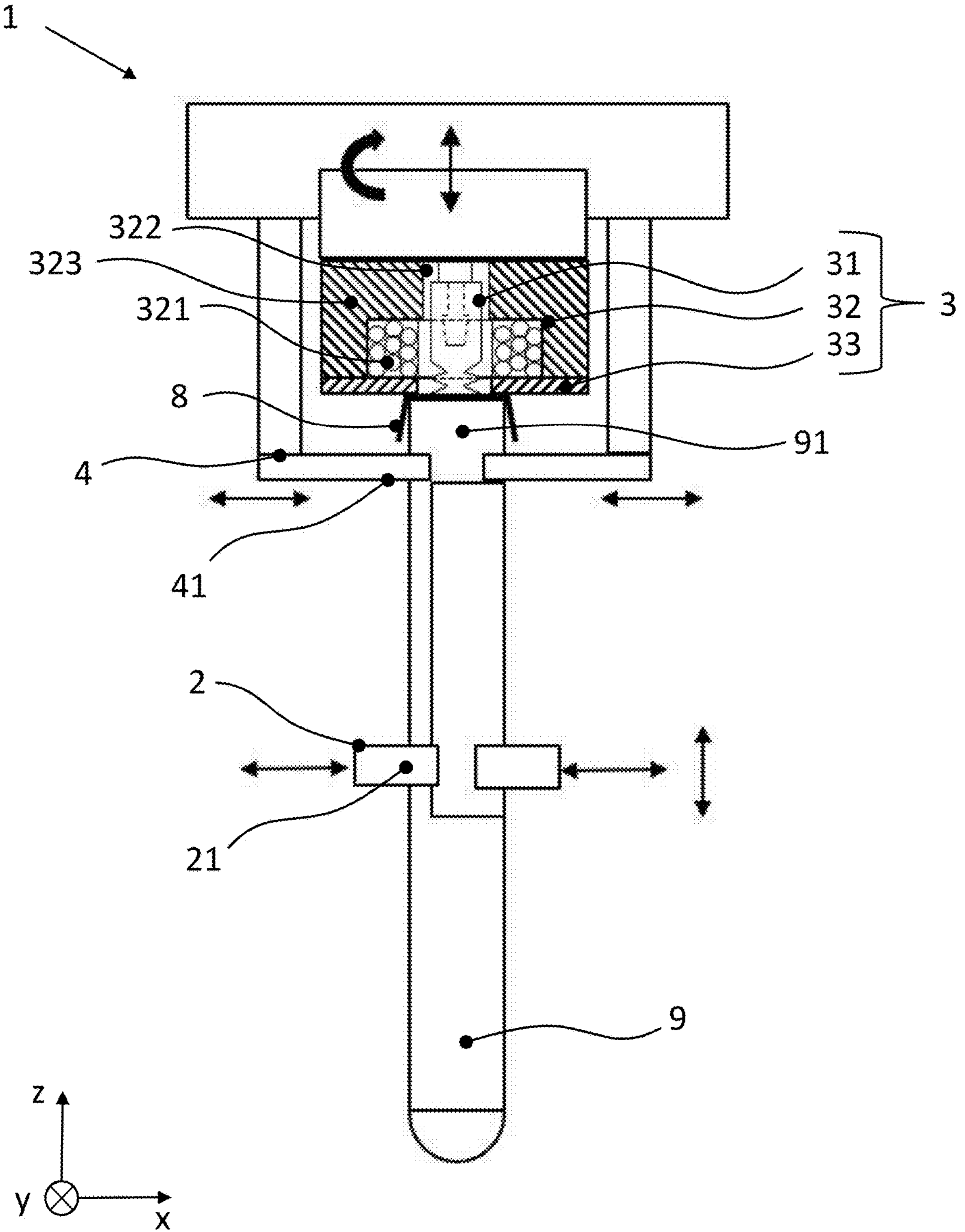
FIG. 1 is a schematic structural illustration of an instrument for automatically removing sealing covers from sample vessels and/or for automatically sealing or resealing sample vessels with sealing covers according to an embodiment of the present invention in a lateral view, partly in cross-section.

1 instrument for automatically desealing and/or sealing/resealing
2 vessel holder
21 vessel holder's sample vessel gripping finger
3; 3' suction/induction device
31 suction member
32 induction member
321 induction coil
322 central opening of induction member
323; 323' rebound member/(inductive) flux concentrator
3231 central opening of rebound member
324 inner wall
33, 33' cover member
331, 331' central through-hole/opening of the cover member
332' step of the cover member for abutment
4 top clamping mechanism
41 top clamping mechanism's sample vessel gripping finger
8 sealing cover
81 bottom side of the sealing cover
82 overhanging part of the sealing cover
9 small diameter sample vessel
9' large diameter sample vessel
91; 91' sample vessel's open or sealed top end S01 first step of desealing method
S02 second step of desealing method
S03 third step of desealing method
S04 fourth step of desealing method
S05 fifth step of desealing method
S11 first step of sealing/resealing method
S12 second step of sealing/resealing method
S13 third step of sealing/resealing method
S14 fourth step of sealing/resealing method
S15 optional fifth step of sealing/resealing method
S16 optional sixth step of sealing/resealing method
S17 optional seventh step of sealing/resealing method

DETAILED DESCRIPTION

FIG. 1 shows a structural and functional concept of an instrument 1 according to an embodiment of the present invention, for automatically removing a sealing cover 8 from a sealed sample vessel 9, i.e. for desealing of the sample vessel 9, wherein the instrument 1 can also be utilized for automatically sealing or resealing such sample vessel with a sealing cover. As can be gathered from the illustration of FIG. 1, the instrument 1 comprises a vessel holder 2, here in the form of a gripper mechanism with e.g. two sample vessel gripping fingers 21, which fingers 21 can move in a lateral direction for gripping the sample vessel 9, here in the form of a sample tube, i.e. in x-direction. The lateral movability of each gripping finger 21 of the gripper mechanism is illustrated in FIG. 1 by a respective double arrow. In addition, the vessel holder 2 can also move in an up-and-down direction, i.e. in an axial direction of the sample vessel 9 in z-direction, in order to be able to e.g. adjust a gripping height of the gripper fingers 21 before gripping the sample vessel 9, or for moving the sample vessel 9 to or away from the rest of the instrument 1 after gripping the sample vessel 9.

In addition to the vessel holder 2, the instrument 1 also comprises a so-called suction/induction device 3, which device primarily exhibits the functions of sucking e.g. the sealing cover 8 by applying negative pressure thereon, and the function of applying magnetic flux onto the sealing cover 8. Therefore, the suction/induction device 3 comprises a suction member 31, for example in the form of a bellows suction cup in the presently described embodiment, which bellows suction cup can be movable in an axial direction towards and away from the vessel holder 2, in order to be able to hold and spatially position the sealing cover 8 in regard to the sample vessel 9. In addition, the suction/induction device 3 of the presently described embodiment of instrument 1 comprises an induction member 32 with an induction coil 321 exhibiting several windings, wherein the windings of the induction coil 321 surround the suction member 31, i.e. the suction member 31 is arranged in the winding-free core of the induction coil 321, which winding-free core can also be referred to as part of a central opening 322 of the induction member 32. Also, in general, the induction device 3 exhibits such central opening 322 in form of a through hole extending through its entirety, for the suction device 3 to be able to be freely movable through the induction member 32.

As can be gathered from FIG. 1, the bottom of the bellows suction cup can suck the sealing cover 8 in order to hold the same. As can also be gathered from the subsequently following figures, the induction member 32 not only comprises the induction coil 321, but also comprises a so-called rebound member 323, also referred to as flux concentrator or magnetic flux concentrator, flux intensifier or flux controller, for directing a magnetic flux generated by the induction coil 321 away from the rebound member 323, i.e. in a direction which is not shielded by the rebound member 323 and, thus, provides undisturbed magnetic flux. In the present embodiment, the rebound member 323 provides for a kind of cup-shaped housing accommodating the induction coil 321 in its inner cavity, with the magnetic flux being directed out of the open end of the thus formed cup. Also, in the present embodiment, the open end of the cup formed by the rebound member 323 is closed by a cover member 33 as part of the suction/induction device 3, wherein the cover member 33 exhibits a central through-hole 331, such that the sealing cover 8 of the sealed sample vessel 9 can abut against the bottom side-face of the cover member 33 at its outer edge, with a central portion of the sealing cover 8 being held by the suction member 31 in a sucking manner, the suction member 31 protruding through the central through-hole 331 of the cover member 33. Here, the thickness of the plate-like cover member 33 provides a respective distance between the induction coil 321 and the upper side-face of the sealing cover 8, such that the induction coil 321 can only be arranged above the sealing cover 8, i.e. farther away from a top end 91 of the sample vessel 9 than the sealing cover 8.

Also, the instrument 1 as depicted in FIG. 1 comprises a top clamping mechanism 4 which is interconnected with the suction/induction device 3 in a way such that the suction/induction device 3 is always coaxially aligned with the centre axis of the sample vessel 9 when the clamping components of the top clamping mechanism 4 are moved together to clamp the sample vessel 9. The suction/induction device 3 can be moved in regard to the top clamping mechanism 4 in an axial direction, as well as in the course of a pivoting movement. The axial movability is depicted in FIG. 1 by means of a double arrow, and the pivot movability is depicted by means of a bent arrow. Accordingly, the suction/induction device 3 can be moved in z-direction as well as pivoted, in order to move the suction/induction device 3 in contact with the sample vessel 9, and to be able to compensate unevenness of the tube opening. With such movability, it becomes possible to exactly position the sample vessel 9 in regard to the suction/induction device 3 in a positional as well as orientational manner, for being able to exactly suck the sealing cover 8 and also for exactly provide any magnetic flux onto the sealing cover 8. As clamping components, the top clamping mechanism 4 of the present embodiment comprises two sample vessel gripping fingers 41 for being able to grip/clamp the top end 91 of the sample vessel 9, here in the form of a gripper mechanism similar to the vessel holder 2, which fingers 41 can move in a lateral direction for gripping the sample vessel 9, here in the form of a sample tube. The lateral movability of each gripping finger 41 of the top clamping mechanism 4 is illustrated in FIG. 1 by means of a respective double arrow. Any lateral movement of each sample vessel gripping finger 41 is always the same for all of the sample vessel gripping fingers 41 in order to guarantee alignment of the sample vessel 9 and the suction/induction device 3.

In regard to an exemplary process using the instrument 1 as depicted in FIG. 1, the sample vessel 9 in the form of the depicted sample tube can be gripped/clamped by a so-called "tube clamp" in the form of the vessel holder 2, in order to avoid lifting up of the tube 9 when the sealing cover 8 is removed by the suction member 31 functioning as a vacuum grippe. Then, either the "tube clamp" 2 brings the tube 9 into the desired z-position, such that the top clamping mechanism 4 is able to clamp the sample vessel 9 below the folded down sealing cover 8 in case of a sealed sample vessel 9, i.e.

moves the tube 9 up or down depending on the tube length, or the suction/induction device 3 functioning as a so-called "coil head" is moved down to the desired z-position such that the top clamping mechanism 4 is able to clamp the sample vessel 9 below the folded down sealing cover 8 in case of a sealed sample vessel 9, again depending on the tube length. Afterwards, the top clamping mechanism 4 functioning as a so-called "coil clamp" clamps the upper end 91 of the tube 9 in order to precisely position a tube opening and the induction coil 321 in the x- and y-direction, which can be guaranteed since the "coil clamp" 4 and the suction/induction device 3 are one unit and the "coil clamp" 4 grips the tube 9 close to its opening by lateral movement of both sample vessel gripping fingers 41 with each sample vessel gripping finger 41 being moved by the same distance such that the center axis of the sample vessel 9 is aligned with the center axis of the suction/induction device 3, but below the overlapping part of the sealing cover 8 and above the "tube clamp" 2. The coaxial centering of the sample vessel 9 to the suction/induction device 3 is facilitated by the movability of the "tube clamp" in x- and y-direction such that the sample vessel 9 is always positioned vertically. Then, the suction/induction device 3 moves in contact with the sealing cover 8 in z-direction with as low as possible force, e.g. spring loaded with a weak spring, or based on the measured tube position via a photoelectric sensor or the like. Then, inductive heating and removal of the sealing cover 8 can be performed, including moving the suction/induction device 3 with the sucked-on sealing cover 8 and the sample tube 9 away from each other.

Figures 2A, 2B, 2C, 2D, 2E, 2F:
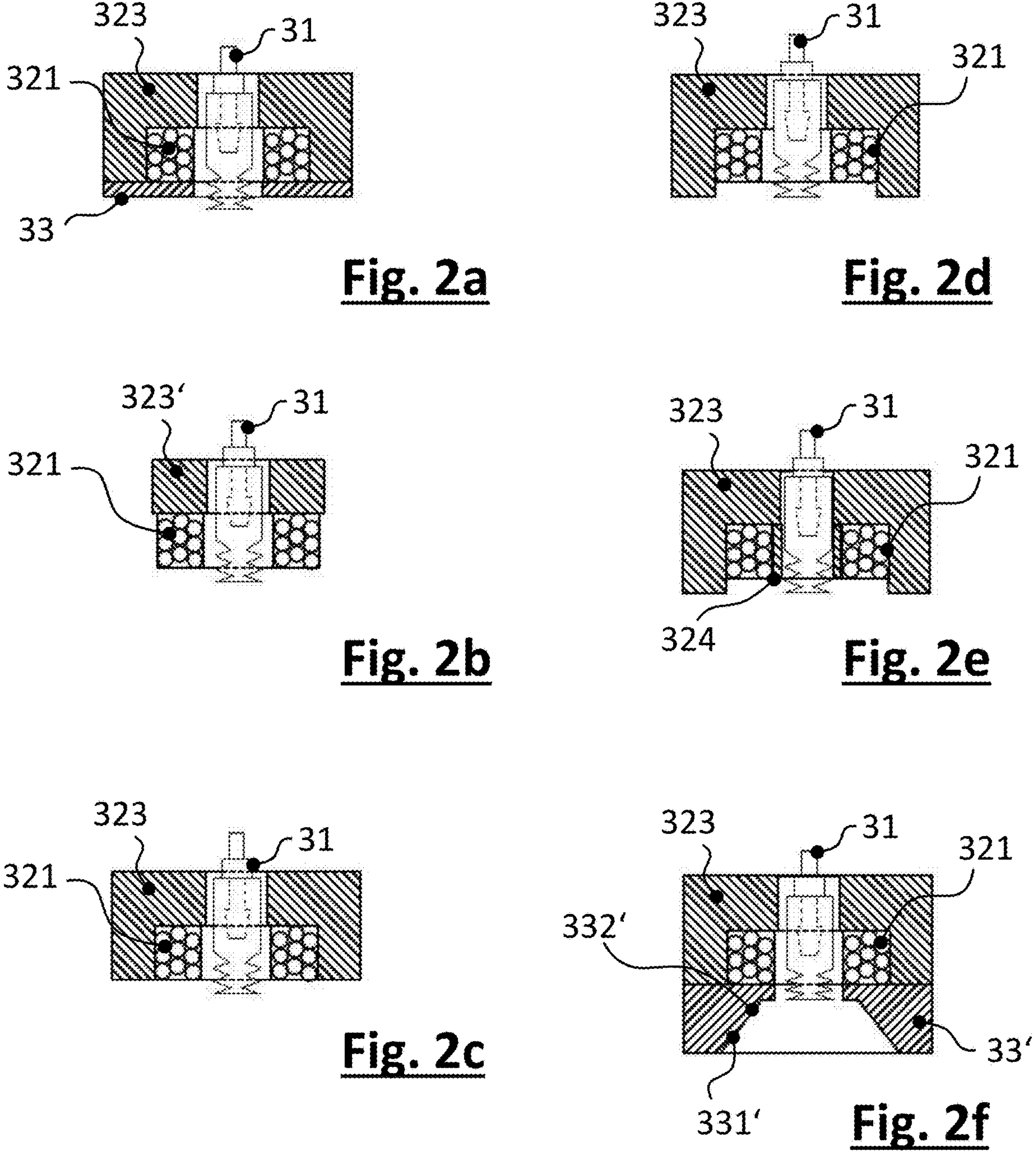
FIGS. 2*a-f* are schematical structural illustrations of a suction/induction device of different embodiment of the instrument of the present invention, in lateral view in cross-section.

In FIGS. 2*a* to 2*f*, structural concepts of different embodiments of a suction/induction device 3 of the instrument 1 of the present invention are depicted in a schematic manner, in lateral view in cross-section. For example, the suction/induction device 3 of the embodiment as shown in FIG. 1 is repeated in FIG. 2*a*, comprising a bellows suction cup suction member 31 movable in an axial direction and an induction member 32 with an induction coil 321, a central opening 322 for axial passage of the suction member 31, and a rebound member 323, which rebound member 323 exhibits a central opening 3231 for continued axial passage of the suction member 31. In regard to the latter, the rebound member 323 assumes a general cup-shape as known from FIG. 1 in each one of the embodiments as shown in FIGS. 2*a*, 2*c*, 2*d*, 2*e* and 2*f*. In doing so, the rebound member 323 for flux concentration is arranged above and on the side of the induction coil 321, i.e. surrounding an axial surface and an outer lateral surface of the induction coil 321, and directing any generated induction flux towards and away from the other axial surface and, in part, also towards and away from the inner lateral surface, i.e. out of the open end of the cup. FIG. 2*b*, however, shows a rather simple structural arrangement, in which not the cup-shaped rebound member 323 but a plate-like rebound member 323' is used, thereby only being able to block magnetic flux at a backside of the induction coil 321, with no blocking to the lateral side. A similar effect can be achieved when using a cup-shaped housing made of no ferrite-based material compositions, such as polymer, ceramics or the like, which results in that the magnetic flux is not concentrated into a certain direction but can then radiate in all directions.

Also, as can be gathered from a direct comparison of the embodiments as shown in FIGS. 2*c* and 2*d*, the induction coil 321 can occupy the entire inner cavity of the cup provided by the rebound member 323 up until its edge, or a lower end of the induction coil 321 directed towards the open end of the cup is arranged with a certain distance to the edge of the cup, in order to avoid direct contact between the lower end of the induction coil 321 and the sealing cover 8 when in use. Furthermore, as can be gathered from FIG. 2*e*, the inner core of the induction coil 321 can be covered by an additional inner wall 324, thereby separating the inner cavity of the cup provided by the rebound member 323 from the central opening 3231. Here, in an axial direction, the cylindrical inner wall 324 does not necessarily extend until the edge of the rebound member 323 but can be implemented in a way such that the inner wall 324 covers an axial extension of the induction coil 321 only. As for FIG. 2*f*, the embodiment as depicted therein provides a similar structure for suction member 31 and the induction member 32. However, an alternative shape of the cover member 33' is implemented, which will be described in further detail in view of FIGS. 4*a* and 4*b* further below.

Figure 3B:
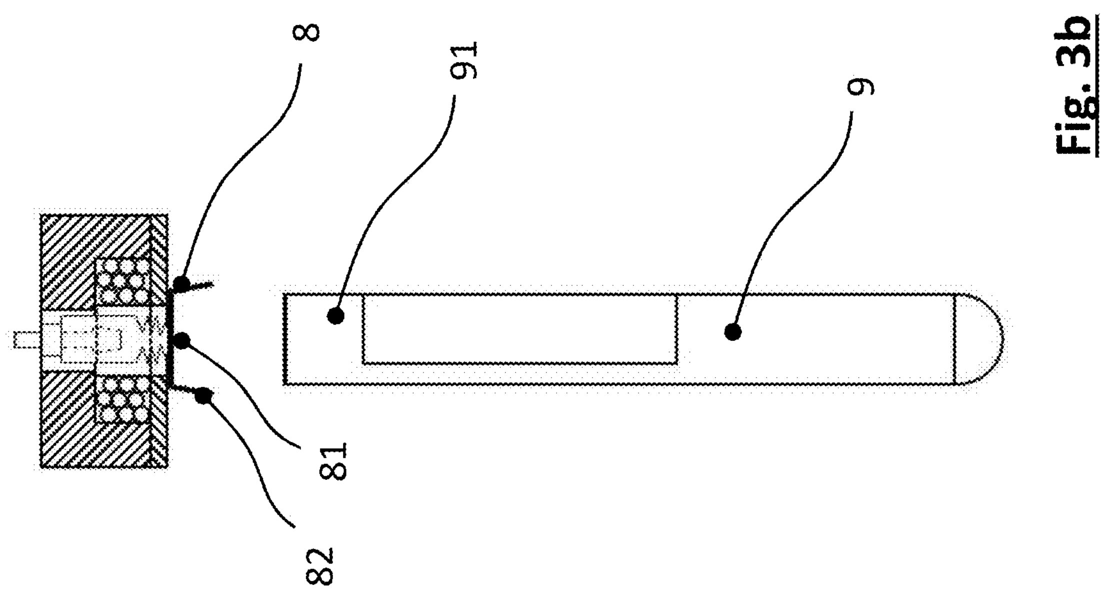
FIGS. 3*a&b* are schematic functional illustrations of removing a sealing cover from a sealed sample vessel by means of an embodiment of the instrument of the present invention, in lateral view, with the respective suction/induction device in cross-section.
Figure 3A:
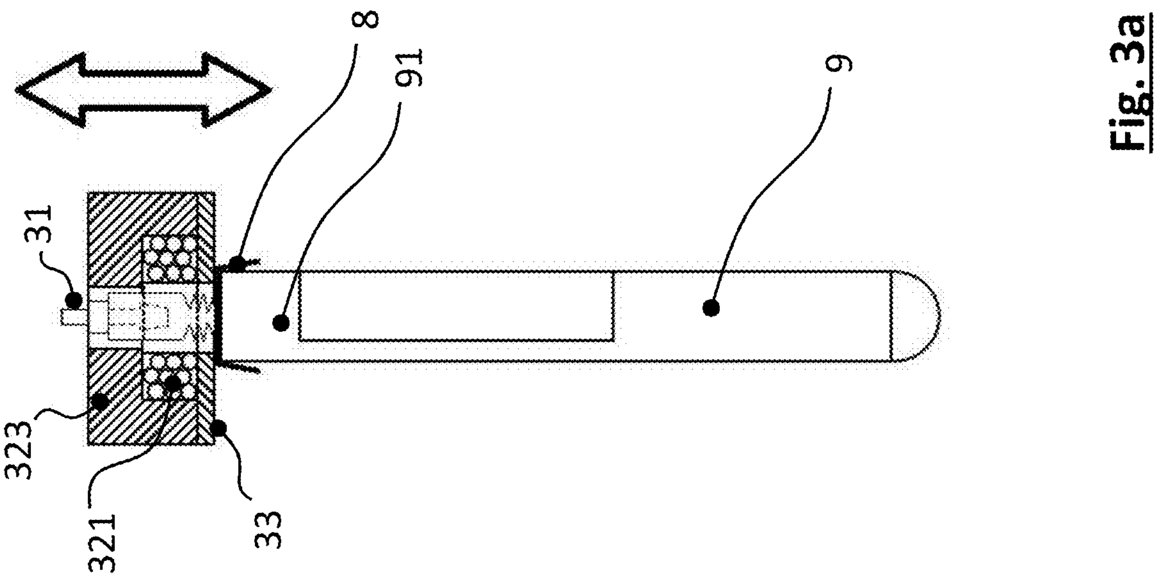

FIGS. 3*a* and 3*b* are schematic functional illustrations of removing a sealing cover 8 from a sealed sample vessel 9 by means of the embodiment of the suction/induction device 3 of FIGS. 1 and 2*a*, wherein sample vessel 9 and suction/induction device 3 are depicted in a cut-free view, i.e. by omitting the remaining components, such as the vessel holder 2 etc., in order to focus on the desealing process. Here, as illustrated by the double arrow in FIG. 3*a*, the suction member 31 with the sucked-on sealing cover 8 is moved in an axial direction of the sample vessel 9, which only occurs during or after a respective magnetic flux has been radiated towards the sealing cover 8 for heating any sealing material, such as a heat seal lacquer, bonding a bottom side 81 of the sealing cover 8 to an upper rim or upper edge of the top end 91 of the sample vessel 9, without heating up any of an overhanging part 82 of the sealing cover 8.

Figure 4B:
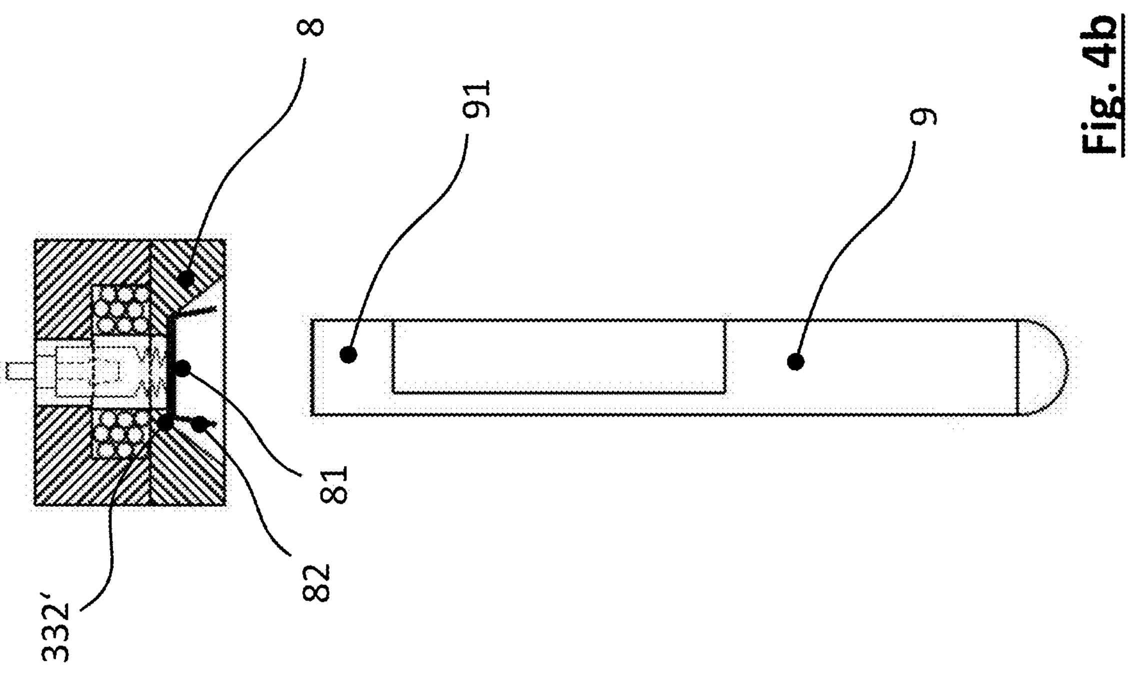
FIGS. 4*a&b* are schematic functional illustrations of removing a sealing cover from a sealed sample vessel by means of another embodiment of the instrument of the present invention, in lateral view, with the respective suction/induction device in cross-section.
Figure 4A:
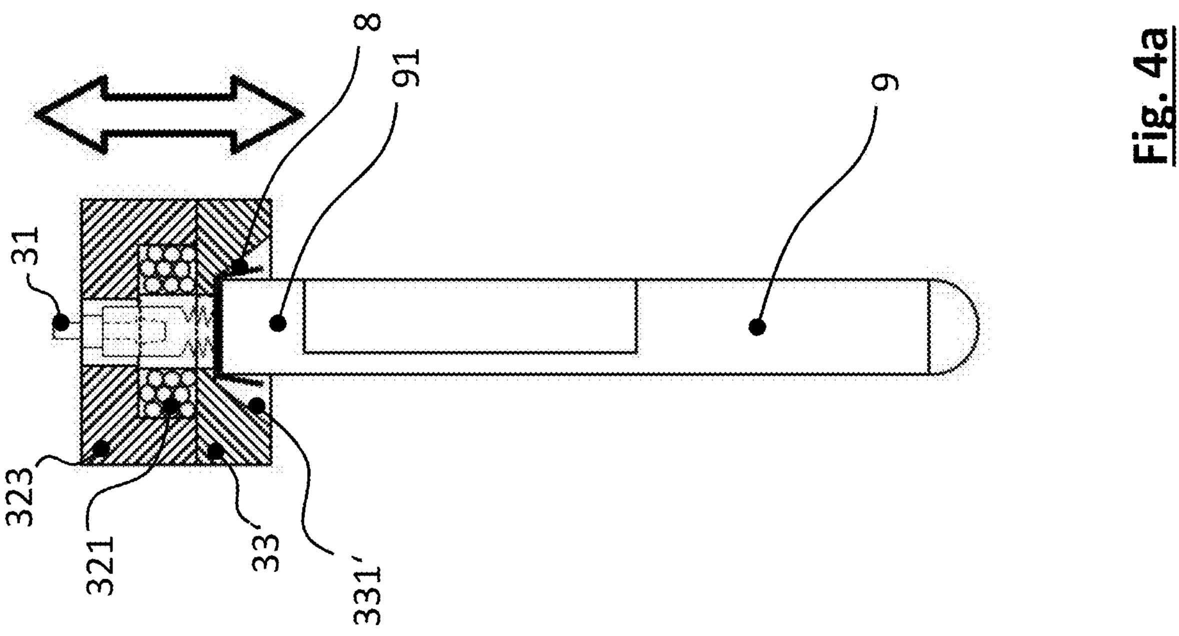

FIGS. 4*a* and 4*b* are schematic functional illustrations of removing a sealing cover 8 from a sealed sample vessel 9 by means of the embodiment of the suction/induction device 3 with the cover member 33' of FIG. 2*f*, wherein sample vessel 9 and suction/induction device 3 are depicted in a cut-free view, i.e. by omitting the remaining components, such as the vessel holder 2 etc., in order to focus on the desealing process. Here, as illustrated by the double arrow in FIG. 4*a*, the suction member 31 with the sucked-on sealing cover 8 is moved in an axial direction of the sample vessel 9, which only occurs during or after a respective magnetic flux has been radiated towards the sealing cover 8 for heating any heat seal lacquer bonding a bottom side 81 of the sealing cover 8 to an upper rim or upper edge of the top end 91 of the sample vessel 9, without heating up any of an overhanging part 82 of the sealing cover 8. Contrary to the embodiment as depicted in FIGS. 3*a* and 3*b*, the embodiment as depicted in FIGS. 4*a* and 4*b* enables that the sealing cover 8 is introduced into a conically-shaped central opening 331' of the cover member 33', which conical central opening 331' is tapered towards the suction member 31 and comprises a step 332' before merging with/passing over into the central opening 322 of the induction member 32. Thus, with the conical central opening 331', a centering function of the sealing cover 8 is achieved, thereby guiding the sealing cover 8 centrally towards a bottom surface of the suction member 31. In addition, the step 332' provides an abutment for the sealing cover 8.

Figure 5B:
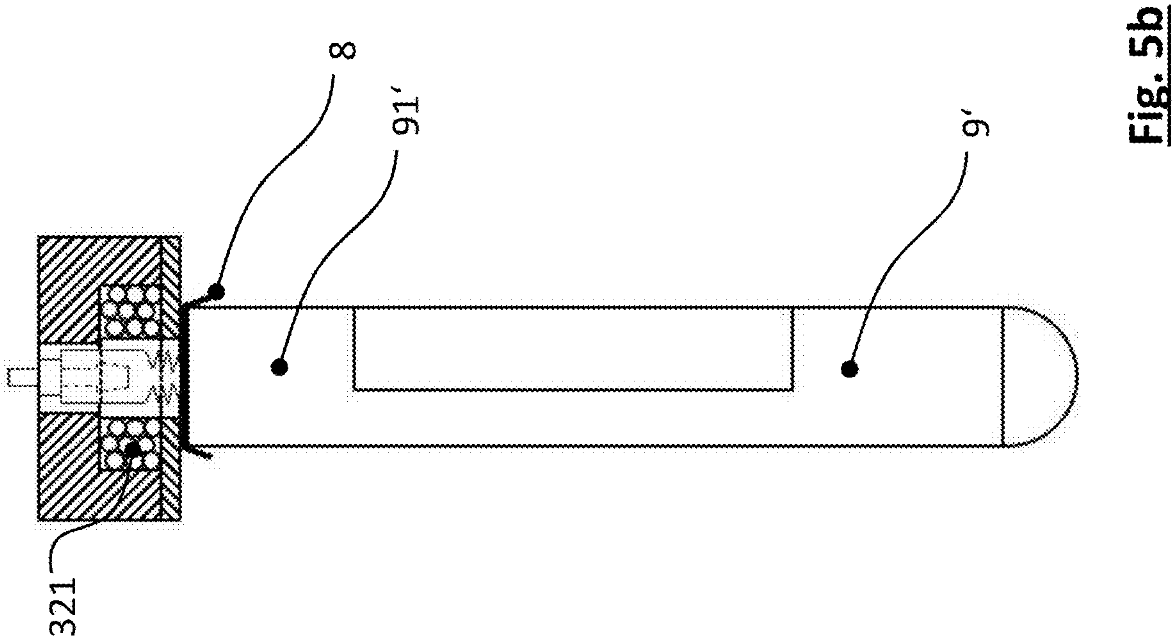
FIGS. 5*a&b* are schematic structural illustrations of an embodiment of a suction/induction device in cross-section, with differing sample vessels exhibiting different outer diameter, for illustration of coverage of a sealing cover by different coils of the induction coil of the suction/induction device.
Figure 5A:
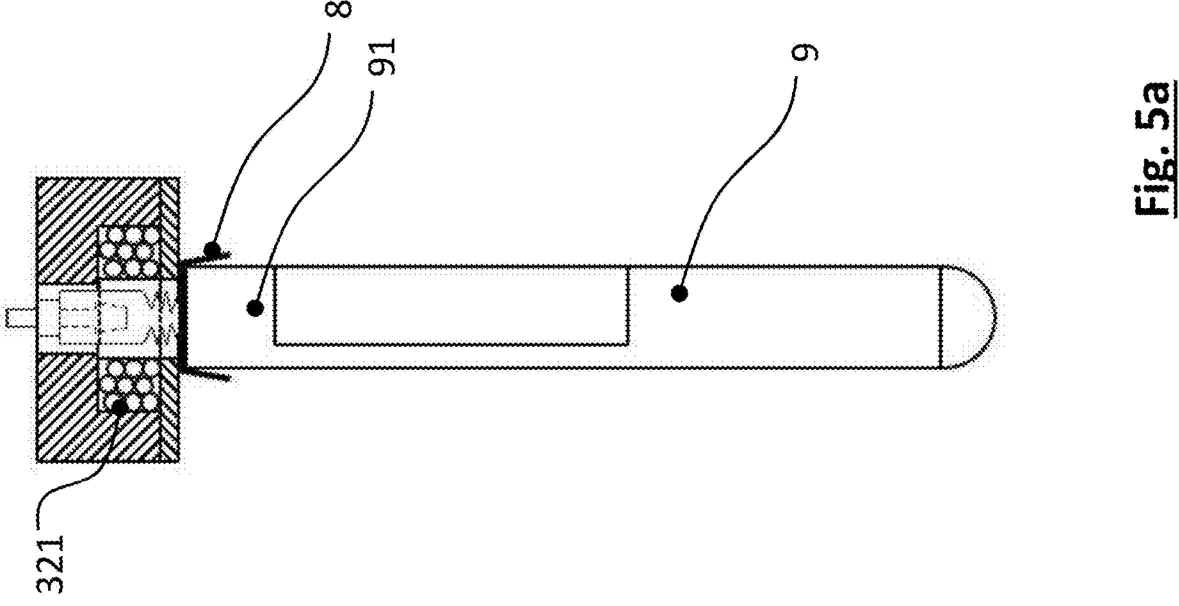

FIGS. 5*a* and 5*b* are schematic structural illustrations of the embodiment of a suction/induction device 3 in cross-section, wherein FIG. 5*a* shows the application of the instrument 1 as depicted in e.g. FIG. 1 to a sample vessel 9 with a small diameter, e.g. a small diameter tube with an outer diameter of 11.4 mm, and sealed with a sealing cover 8 with 23 mm diameter, whereas FIG. 5*b* shows the application of the instrument 1 as depicted in e.g. FIG. 1 to a sample vessel 9' with a large diameter, e.g. a large diameter tube with an outer diameter of 15.6 mm, and sealed with a sealing cover 8 with 23 mm diameter. Thus, when comparing these illustrations, it becomes clear that a larger outer diameter of the sample vessel 9, 9' has an impact on the coverage by the induction coil 321, i.e. how many of the coil windings must be applied with current in order to cover the area targeted for inductive heating, i.e. the area of the sealing cover 8 being attached to the rim of the sample vessel 9, 9'.

Figure 6B:
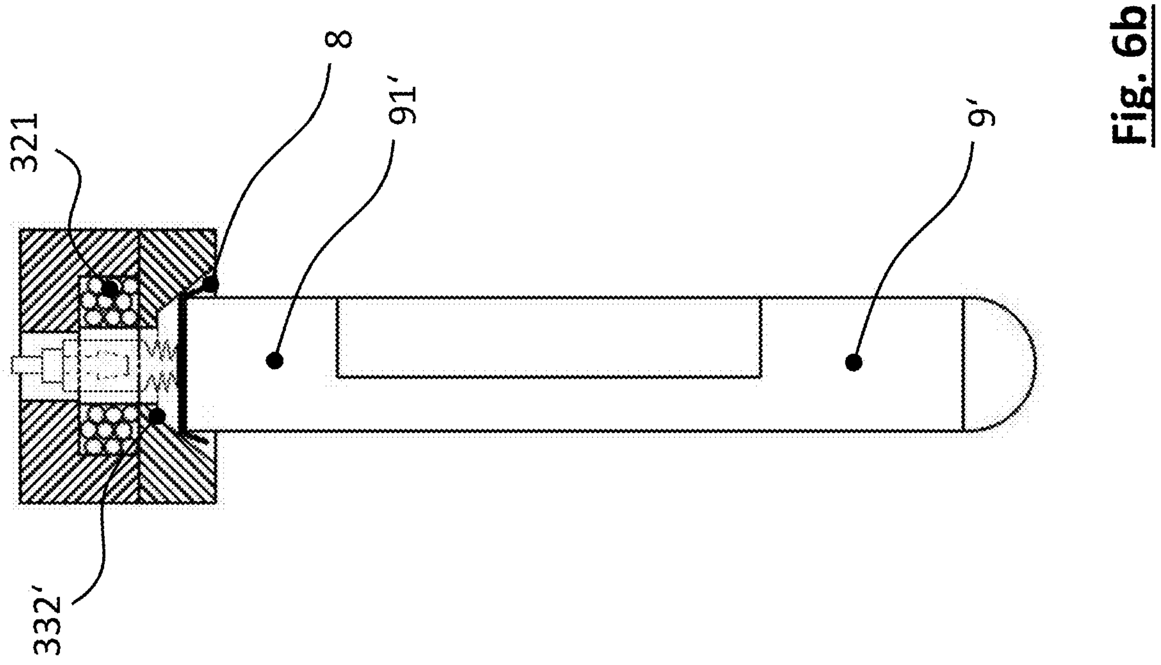
FIGS. 6*a&b* are schematic structural illustrations of another embodiment of a suction/induction device in cross-section, with differing sample vessels exhibiting different outer diameter, for illustration of coverage of a sealing cover by different coils of the induction coil of the suction/induction device.
Figure 6A:
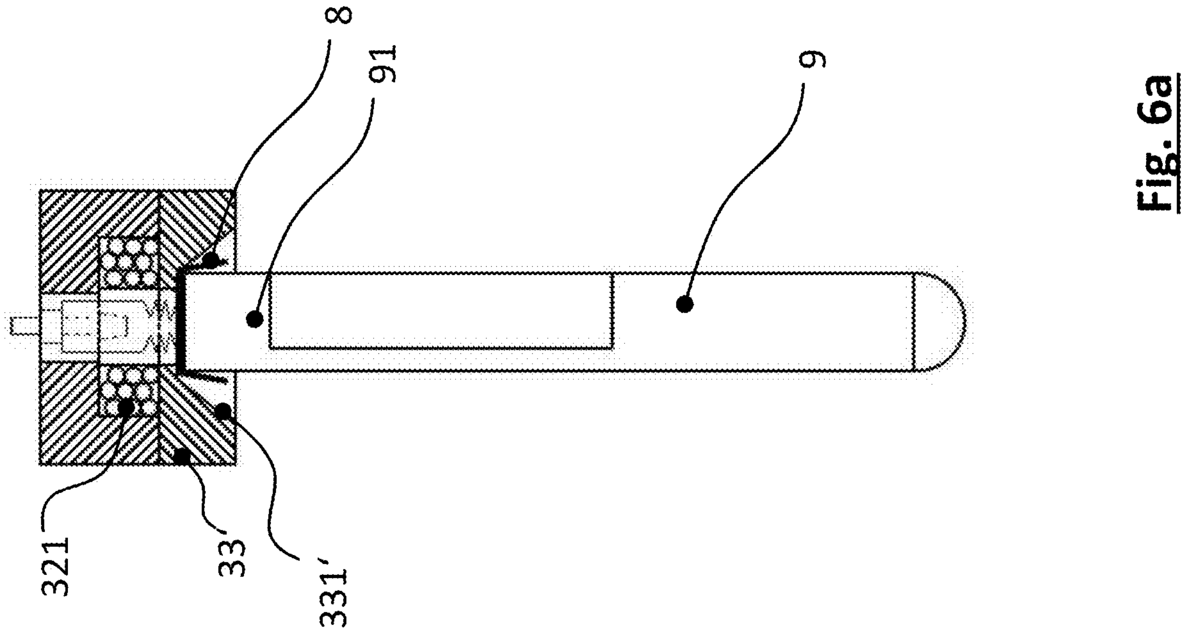

Similarly to FIGS. 5*a* and 5*b*, FIGS. 6*a* and 6*b* are schematic structural illustrations of the embodiment of a suction/induction device 3 in cross-section, wherein FIG. 6*a* shows the application of the instrument 1 as depicted in e.g. FIGS. 2*f*, 4*a* and 4*b* to a sample vessel 9 with a small diameter, such as a small diameter tube with an outer diameter of e.g. 11.4 mm, and sealed with a sealing cover 8 with e.g. 23 mm in diameter, whereas FIG. 6*b* shows the application of the instrument 1 as depicted in e.g. FIGS. 2*f*, 4*a* and 4*b* to a sample vessel 9' with a large diameter, such as a large diameter tube with an outer diameter of e.g. 15.6 mm, and sealed with a sealing cover 8 with e.g. 23 mm in diameter. Thus, when comparing these illustrations, it becomes clear that a larger outer diameter of the sample vessel 9, 9' has an impact on the coverage by the induction coil 321, i.e. how many of the coil windings must be applied with current in order to cover the area targeted for inductive heating, i.e. the area of the sealing cover 8 being attached to the rim of the sample vessel 9, 9'. Here, in addition, it can be derived that the sample vessel 9' with larger outer diameter cannot be introduced deep into the conical central opening 331', i.e. the sealing cover 8 cannot abut against the step 332' but will abut against an corresponding area in the tapered part, resulting in that more distance between sealing cover 8 and induction coil 321 exists, i.e. that more current must be applied in order to achieve sufficient inductive heating before being able to remove the sealing cover 8, or before being able to seal/reseal the sample vessel 9' with the sealing cover 8.

Figure 7A:
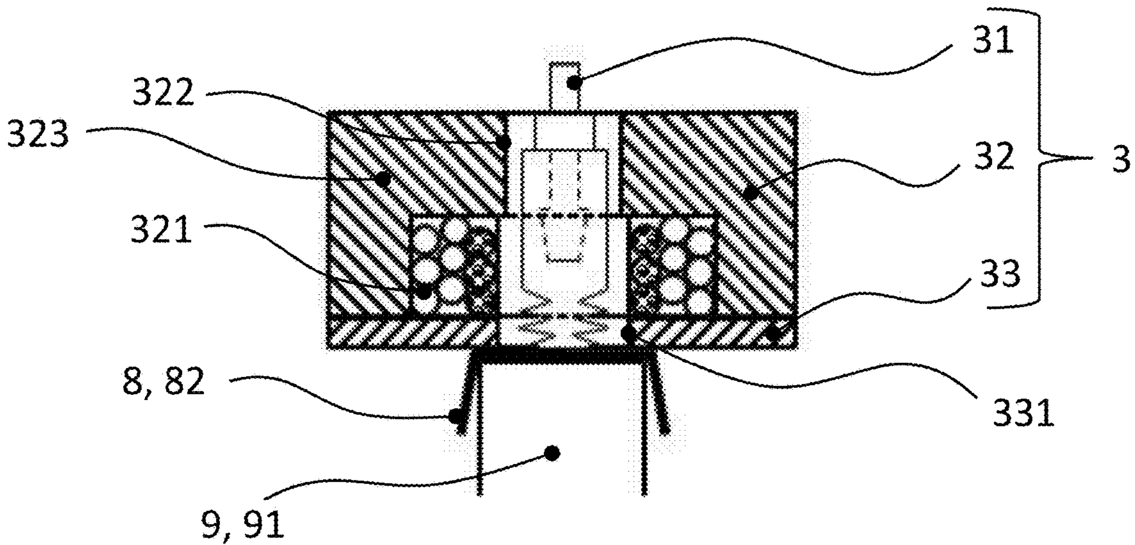
FIGS. 7*a&b* are schematic structural illustrations of the embodiment of a suction/induction device as shown in FIGS. 5*a&b*, illustrating current flow in respective coils of the induction coil of the suction/induction device depending on the outer diameter of the sample vessel to be handled, for illustration of coverage of a sealing cover depending on the induction coils applied with current.
Figure 7B:
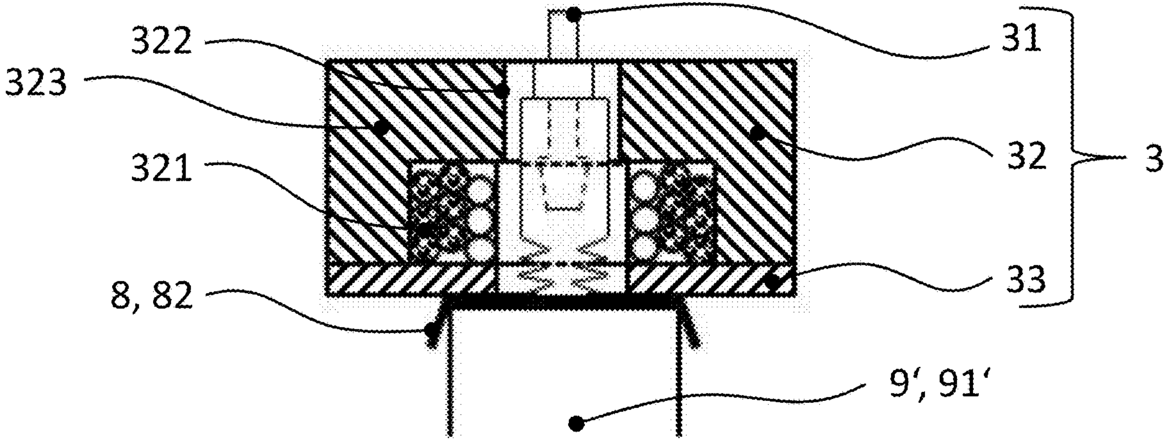

FIGS. 7*a* and 7*b* give an example in regard to the application of current onto different areas of the induction coil 321 when using differently sized sample vessels 9, 9', i.e. sample tubes 9, 9' with different diameters. Here, the induction coil 321 can exhibit several windings within each other, in particular inner windings, middle windings and outer windings, which can all be controlled separately from each other by means of separate drivers, i.e. one single coil as induction coil 321 can be segmented in different parts. Alternatively, the induction coil 321 consists of three separate induction coils, an inner induction coil, a middle induction coil and an outer induction coil. In particular, the exemplary use of the instrument 1 on a sample tube 9 with small diameter as given in FIG. 5*a* is depicted in FIG. 7*a*, and the exemplary use of the instrument 1 on a sample tube 9' with large diameter as given in FIG. 5*b* is depicted in FIG. 7*b*. As can be gathered from FIG. 7*a*, the sample tube 9 with small diameter extends over an area which overlaps with only the inner windings of the induction coil 321, or the inner induction coil in case of a plurality of induction coils arranged within each other. In further detail, the induction windings applied with current for inductive heating of the area of the sealing cover 8 provided with sealing material are marked by dotted markings in FIG. 7*a*, i.e. three windings on the inner side adjacent to the suction member 31. Thereby, only the contact area between the bottom side 81 of the sealing cover 8 and a tube rim of the top end 91 of the small diameter sample vessel 9 is heated by application of magnetic flux. In contrast thereto, as can be gathered from FIG. 7*b*, the sample tube 9' with large diameter extends over an area which overlaps with the middle windings and the outer windings of the induction coil 321, or the middle induction coil and the outer induction coil in case of a plurality of induction coils arranged within each other. In further detail, the induction windings applied with current for inductive heating of the area of the sealing cover 8 provided with sealing material are marked by dotted markings in FIG. 7*b*, i.e. three windings in the middle and three windings on the outer side adjacent to the outer wall of the rebound member 323 of the induction member 32. Thereby, only the contact area between the bottom side 81 of the sealing cover 8 and a tube rim of the top end 91' of the large diameter sample vessel 9' is heated by application of magnetic flux.

As a concrete example in view of the exemplary dimensions of the sample tube diameters as given above, the inner windings can cover a diameter area of 11 mm to 12 mm, the middle windings can cover a diameter area of 12 mm to 14 mm, and the outer windings can cover a diameter area of 14 mm to 16 mm. Alternatively, a small diameter coil with a winding diameter of about 11-12 mm can be used as inner coil, a middle diameter coil with a winding diameter of about 12-14 mm can be used as middle coil, and a large diameter coil with a winding diameter of about 14-16 mm can be used as outer coil.

Figure 8:
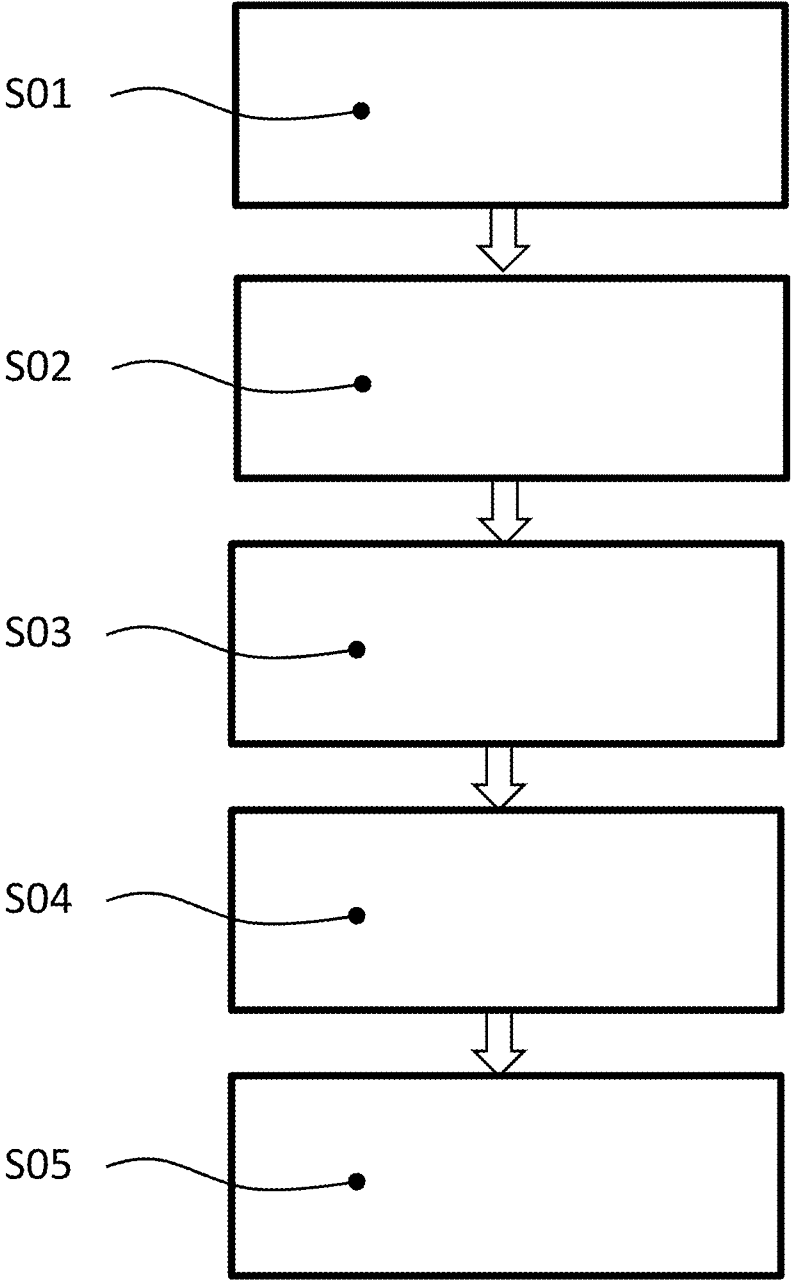
FIG. 8 is a flowchart of a desealing method using the instrument according to an embodiment of the present invention.

FIG. 8 shows a flowchart of an automatic desealing method using the instrument 1 of the present invention. In further detail, the depicted method achieves automatically removing sealing covers 8 from sample vessels 9, 9' by means of the instrument 1 as described above, wherein the method comprises the following steps:

Step S01: providing a sealed sample vessel 9, 9' in the vessel holder 2, for holding the sample vessel 9, 9' in a predetermined orientation.

Step S02: moving the suction/induction device 3 and the vessel holder 2 towards each other until the suction/induction device 3, or rather a bottom end of the suction member 31, and the upper side face of the sealing cover 8 are in contact with each other, with the induction member 32 including the induction coil 321 being positioned above the sealing cover 8.

Step S03: sucking the sealing cover 8 by means of the suction member 31 applying negative pressure onto the sealing cover 8.

Step S04: applying a current to the induction coil 321, or to the area of the induction coil 321 covering the contact area between tube rim and sealing cover 8, for melting the sealing material provided between the sample vessel 9, 9' and the sealing cover 8 at its bottom side 81.

Step S05: moving the suction/induction device 3 and the vessel holder 2 away from each other while maintaining negative pressure applied onto the sealing cover 8, thereby removing the sealing cover 8 from the sample vessel 9, 9'.

In view of the above, it must be appreciated that the steps can be carried out in the given order, wherein certain steps can overlap, such as the step S04 of applying a current to the induction coil 321 and the step S05 of moving the suction/induction device 3 and the vessel holder 2 away from each other, since the application of a pulling force onto the sealing cover 8 as a result of the suction step and of the subsequent moving step, and the melting of the sealing material provided between the sample vessel 9, 9' and the sealing cover 8 can be used not only subsequently, such that the sucked sealing cover 8 with the melted sealing material, preferably still in its melted condition, is pulled away from the sample vessel 9, 9' in order to achieve a smooth and problem-free removal of the sealing cover 8 from the sample vessel 9, 9'.

Also, in the course of the step S05 of moving the suction/induction device 3 and the vessel holder 2 towards each other, this step can include a centering of the sealed sample vessel 9, 9' to the induction member 32, in particular when using a suction/induction device 3 as depicted in e.g. FIG. 2*f*.

Figure 9:
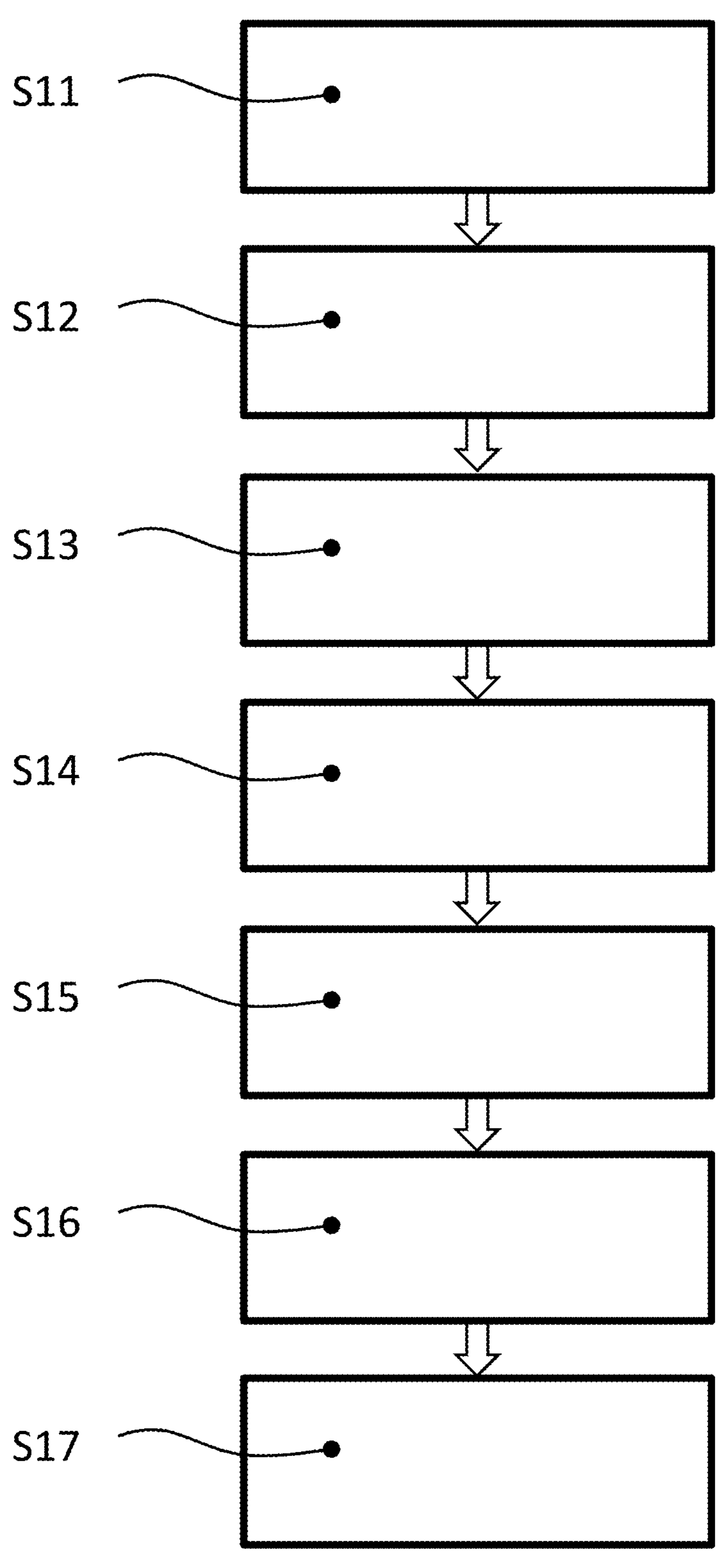
FIG. 9 is a flowchart of a sealing/resealing method using the instrument according to an embodiment of the present invention.

Finally, FIG. 9 shows a flowchart of an automatic sealing/resealing method using the instrument 1 of the present invention. In further detail, the depicted method achieves automatically sealing or resealing of sample vessels 9, 9' with sealing covers 8 by means of the instrument 1 as described above. In further detail, the sealing/resealing method comprises the following steps:

Step S11: providing an open sample vessel 9, 9' in the vessel holder 2, for holding the sample vessel 9, 9' in a predetermined orientation.

Step S12: providing a sealing cover 8 and sucking the sealing cover 8 by means of the suction member 31 applying negative pressure onto the sealing cover 8.

Step S13: moving the suction/induction device 3 and the vessel holder 2 towards each other until a bottom side 81 of the sealing cover 8 is in contact with the open top end 91, 91' of the sample vessel 9, 9', with the induction member 32 being positioned above the sealing cover 8.

Step S14: applying a current to the induction coil 321, for melting a sealing material provided at the bottom side 81 of the sealing cover 8, thereby sealing the open end 91, 91' of the sample vessel 9, 9' with the sealing cover 8.

The above describes the basic core method for sealing or resealing an open sample vessel 9, 9', until the sample vessel 9, 9 is sealed shut. In addition, the method can comprise further steps, as follows:

Step S15: stopping the application of negative pressure onto the sealing cover 8.

Step S16: moving the suction/induction device 3 and the vessel holder 2 away from each other.

Step S17: folding excess parts of the sealing cover 8, which excess parts project from the sample vessel 9, 9' outwards, towards an outer circumference of the sample vessel 9, 9'. Here, as an example, the folding down of excess parts of the sealing cover 8 can be implemented by the use of the conically-shaped central opening 331' of the cover member 33', which conical central opening 331' can not only be useful for centering the top end 91, 91' of the sample vessel 9, 9' towards the induction coil 321, but also to provide the necessary angle for pushing the excess parts of the sealing cover 8 downwards. Alternatively, the step of folding excess parts of the sealing cover 8 downwards can also be implemented by means of a separate component exhibiting a conical opening.

In view of the above, it must be appreciated that the steps can be carried out in the given order, wherein certain steps can overlap, such as the folding step S17 and the moving step S13.

While the current invention has been described in relation to its specific embodiments, it is to be understood that this description is for illustrative purposes only. Accordingly, it is intended that the invention be limited only by the scope of the claims appended hereto.

The invention claimed is:

1. An instrument for automatically removing sealing covers from sample vessels and/or for automatically sealing or resealing sample vessels with sealing covers, the instrument comprising a vessel holder for holding a sample vessel, and a suction/induction device comprising a suction member for holding a sealing cover, and an induction member comprising at least one induction coil, wherein the suction/induction device and the vessel holder are arranged in an axially movable manner with regard to each other, and in use, the at least one induction coil is arranged above a bottom of the suction member or at the same height as the bottom of the suction member.

2. The instrument according to claim 1, wherein the suction member is arranged within a central opening of the induction member.

3. The instrument according to claim 2, wherein the central opening of the induction member coincides with a core of the at least one induction coil, the induction coil thereby surrounding the suction member.

4. The instrument according to claim 1, wherein the induction member further comprises a rebound member for directing a magnetic flux of the induction member away from the rebound member wherein the rebound member comprises a central opening coaxially aligned with the central opening of the induction member.

5. The instrument according to claim 4, wherein the rebound member comprises a plate-like shape or a cup-like shape accommodating the at least one induction coil within its inner cavity.

6. The instrument according to claim 5, wherein the rebound member has an identical outer diameter as the induction member and wherein the inner cavity of the rebound member is separated from its central opening by an inner wall.

7. The instrument according to claim 4, wherein the suction/induction device further comprises a cover member arranged at the induction member on a side opposite to the rebound member.

8. The instrument according to claim 7, wherein the cover member comprises a plate-like shape with a central opening coaxially aligned with the central opening of the induction member.

9. The instrument according to claim 8, wherein the central opening of the cover member comprises a conical shape tapered towards the suction member.

10. The instrument according to claim 9, wherein the conical central opening of the cover member comprises a step before merging with the central opening of the induction member.

11. The instrument according to claim 4, wherein the central opening of the rebound member has an identical inner diameter as the central opening of the induction member.

12. The instrument according to claim 7, wherein the cover member consists of an electrically non-conductive and/or non-magnetic material.

13. The instrument according to claim 8, wherein the central opening of the cover member has an identical inner diameter as the central opening of the induction member.

14. The instrument according to claim 1, wherein the suction member and the induction member of the suction/induction device are interconnectedly formed with each other;

the suction member and the induction member are arranged in a coaxial manner;

the suction/induction device is arranged in a tiltable manner in regard to the vessel holder;

the suction member comprises a bellows suction cup or a flat suction cup; and/or at least one of the suction/induction device and the vessel holder is spring-loaded towards the other in an axial manner.

15. The instrument according to claim 14, wherein the suction member, the induction member and the vessel holder are arranged in a coaxial manner.

16. The instrument according to claim 1, wherein the at least one induction coil of the induction member is segmented radially into different areas including respective windings, for size-control of an area of the induction member providing magnetic flux; and/or the at least one induction coil consists of internally cooled hollow wires.

17. The instrument according to claim 1, wherein the instrument further comprises a top clamping mechanism interconnectedly arranged with the suction/induction device, the top clamping mechanism being adapted to clamp a top end of the sample vessel beneath its sealing cover, for accurately positioning the top end of the sample vessel and the suction/induction device the vessel holder is a bottom clamping mechanism.

18. The instrument according to claim 17, wherein the top clamping mechanism is provided in the form of at least two sample vessel gripping fingers; and/or the bottom clamping mechanism is in the form of at least two sample vessel gripping fingers.

19. A laboratory automation system comprising a plurality of pre-analytical, analytical and/or post-analytical stations, and an instrument according to claim 1.

20. A method of automatically removing sealing covers from sample vessels by means of an instrument according to claim 1, the method comprising the following steps:

(S01) providing a sealed sample vessel in the vessel holder, for holding the sample vessel in a predetermined orientation;

(S02) moving the suction/induction device and the vessel holder towards each other until the suction/induction device and the sealing cover are either in contact with each other or in a predetermined distance to each other, with the induction member being positioned above the sealing cover;

(S03) sucking the sealing cover by means of the suction member applying negative pressure onto the sealing cover;

(S04) applying a current to the at least one induction coil, for melting a sealing material provided at a bottom side of the sealing cover; and (S05) moving the suction/induction device and the vessel holder away from each other while maintaining negative pressure applied onto the sealing cover, thereby removing the sealing cover from the sample vessel.

21. The method of claim 20, wherein the step (S02) of moving the suction/induction device and the vessel holder towards each other includes a centering of the sealed sample vessel to the induction member.

22. The method of claim 20, wherein the step (S04) of applying a current to the at least one induction coil includes applying the current to inner and/or outer areas of the at least one induction coil, depending on the diameter of the sealed sample vessel.

23. The method of claim 22, wherein the induction coil areas applied with current correlate to a top rim area of the sealed sample vessel.

24. The method of claim 20, wherein a magnitude of the applied current, an application time of the current and/or a distance between the at least one induction coil and the sealing cover is adapted to the material of the sealed sample vessel and/or to a vessel diameter of the sealed sample vessel.

25. The method of claim 20, wherein the step (S04) of applying a current to the at least one induction coil and the step (S05) of moving the suction/induction device and the vessel holder away from each other overlap each other, for applying a pulling force onto the sealing cover during melting of the sealing material provided between the sample vessel and the sealing cover.

26. A method of automatically sealing or resealing sample vessels with sealing covers by means of an instrument according to claim 1, the method comprising the following steps:

(S11) providing an open sample vessel in the vessel holder, for holding the sample vessel in a predetermined orientation;

(S12) providing a sealing cover and sucking the sealing cover by means of the suction member applying negative pressure onto the sealing cover;

(S13) moving the suction/induction device and the vessel holder towards each other until a bottom side of the sealing cover is in contact with the open top end of the sample vessel, with the induction member being positioned above the sealing cover; and (S14) applying a current to the at least one induction coil, for melting a sealing material provided at the bottom side of the sealing cover, thereby sealing the open top end of the sample vessel with the sealing cover.

27. The method of claim 26, wherein the method further comprises (S15) stopping the application of negative pressure onto the sealing cover, and (S16) moving the suction/induction device and the vessel holder away from each other, preferably wherein the method further comprises (S17) folding excess parts of the sealing cover, which excess parts project from the sample vessel outwards, towards an outer circumference of the sample vessel.

28. The method of claim 26, wherein the step (S12) of providing the sealing cover includes providing a sealing foil and cutting the sealing foil into a shape suitable for sealing the sample vessel.

29. The method of claim 28, wherein the suitable shape is a square shape.

30. The method of claim 26, wherein the step (S13) of moving the suction/induction device and the vessel holder towards each other includes a centering of the sample vessel to the suction/induction device.

31. The method of claim 26, wherein the step (S14) of applying a current to the at least one induction coil includes applying the current to inner and/or outer areas of the at least one induction coil, depending on the diameter of the sample vessel.

32. The method of claim 31, wherein the induction coil areas applied with current correlate to a top rim area of the sample vessel.

33. The method of claim 26, wherein a magnitude of the applied current, an application time of the current and/or a distance between the at least one induction coil and the sealing cover is adapted to the material of the sample vessel and/or to a vessel diameter of the sample vessel.

* * * * *